US006910546B2

(12) United States Patent
Tsutsumi et al.

(10) Patent No.: US 6,910,546 B2
(45) Date of Patent: Jun. 28, 2005

(54) MOTORCYCLE INDUCTION SYSTEM

(75) Inventors: Mitsuo Tsutsumi, Shizuoka (JP); Yoshihito Oyama, Shizuoka (JP); Kazuhisa Itou, Shizuoka (JP); Nobuhisa Ide, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/165,714

(22) Filed: Jun. 7, 2002

(65) Prior Publication Data

US 2002/0185323 A1 Dec. 12, 2002

(30) Foreign Application Priority Data

Jun. 8, 2001 (JP) ....................................... 2001-174491

(51) Int. Cl.[7] ................................................ B60K 11/04
(52) U.S. Cl. ...................... 180/219; 55/385.3; 55/16.28
(58) Field of Search ................................ 180/219, 220, 180/229, 68.1, 68.3; 123/198 E; 55/385.3, DIG. 28

(56) References Cited

U.S. PATENT DOCUMENTS

| | | | | | |
|---|---|---|---|---|---|
| 31,877 | A | | 4/1861 | Dice | 180/219 |
| 31,994 | A | | 4/1861 | Pennie | |
| 4,648,474 | A | * | 3/1987 | Shinozaki et al. | 180/219 |
| 4,796,719 | A | * | 1/1989 | Shiratsuchi | 180/219 |
| 5,560,446 | A | * | 10/1996 | Onishi | 180/219 |
| 5,577,570 | A | * | 11/1996 | Shiohara et al. | 180/219 |
| 5,887,673 | A | * | 3/1999 | Matsumura et al. | 180/219 |
| 5,908,079 | A | * | 6/1999 | Amino | 180/219 |
| 5,918,576 | A | | 7/1999 | Ohoka et al. | |

FOREIGN PATENT DOCUMENTS

| | | |
|---|---|---|
| JP | 11134340 | 5/1999 |

* cited by examiner

*Primary Examiner*—Lesley D. Morris
*Assistant Examiner*—L. Lum
(74) *Attorney, Agent, or Firm*—Knobbe, Martens, Olson & Bear, LLP

(57) ABSTRACT

An induction system for a motorcycle includes first and second intake air chambers. Each intake air chamber includes its own filter. One of the air chambers can be disposed on a side of the engine and the other air chamber can be disposed above the top of the engine.

25 Claims, 16 Drawing Sheets

MOTORCYCLE INDUCTION SYSTEM

PRIORITY INFORMATION

This application is based on and claims priority to Japanese Patent Application No. 2001-174491 filed Jun. 8, 2001, the entire contents of which is hereby expressly incorporated by reference.

BACKGROUND OF THE INVENTION

1. Field of the Invention

The present invention generally relates to an induction system for motorcycle. More specifically, the present invention relates to an air silencer and filter arrangement for a motorcycle engine.

2. Description of the Related Art

In a motorcycle having a V-type engine, the engine is generally mounted on the frame with the crankshaft oriented transversely with respect to the longitudinal direction of the motorcycle. A space is therefore defined between the fore and aft cylinders and one or more carburetors are disposed in this space. The cylinders are formed with intake ports at the sides facing toward the space so as to be connected with the carburetor or carburetors in the space.

In this type of motorcycle, an air filter is typically disposed behind the engine so that intake passages extend from the air filter, around the aft cylinder, and to the space between the cylinders. Such an intake system is difficult to manufacture because the intake passages are relatively long.

Other induction system designs have included an air chamber and filter disposed above the engine. However, because the fuel tank is typically disposed directly above the engine of a motorcycle, there is little space between the top of the engine and the fuel tank for an air chamber and air filter assembly.

Japanese Patent No. 2857926 discloses a motorcycle having an induction system comprising an air box disposed rearward from the engine in which two air filters are disposed. Each air filter is fed with a different intake pipe. The intake pipes open through an upper surface of the air box. One filter is disposed adjacent an upper surface of the air box and a smaller is disposed below the first filter. This design, however, is difficult to use with a V-type engine having the throttle bodies disposed in the space between the cylinders.

SUMMARY OF THE INVENTION

In accordance with one aspect of the present invention, motorcycle includes a frame, an engine supported by the frame, a wheel supporting the frame, and a transmission connecting the engine with the wheel. The motorcycle also includes an induction system configured to guide air to the engine. The induction system includes first intake air chamber having a first inlet, a first outlet, and a first filter. Additionally, the intake system includes a secondary air chamber having a second filter and a second outlet portion, the first outlet being connected to the second intake air chamber.

By providing the motorcycle with an induction system having two intake air chambers, each having its own filter, the induction system can be arranged to take advantage of different places on the motorcycle where space is available for induction system components. For example, one of the air chambers can be disposed on top of the engine, and another air chamber can be disposed on the side of the engine. Additionally, by connecting the first intake air chamber to the second intake air chamber, a plurality of intake passages of the engine can be connected to the second intake air chamber, thereby providing a common volume of air from which induction air is drawn to the engine. Thus, noise emanating from the intake passages of the engine are attenuated to substantially the same degree. Additionally, other characteristics of the air flow into each induction passage is uniform because all of the induction air enters a common passage before being diverted to the intake passages. For example, the temperature and pressure of the induction air in the second chamber can be detected and used for engine control routines.

In accordance with another aspect of the invention, an induction system for an internal combustion engine includes the first intake air chamber having a first inlet, a first air filter, and a first outlet. The induction system also includes a second intake air chamber including a second inlet, a second air filter, and a second outlet connected to an induction passage of the engine. The first intake air chamber is connected to the second air intake chamber downstream of the second air filter.

In accordance with another aspect to the present invention, a motorcycle includes a frame, an engine supported by the frame, a wheel supporting the frame, and a transmission connecting the engine with the wheel. The motorcycle also includes an induction system configured to guide air to the engine. The induction system includes a first intake air chamber connected to a second intake air chamber. The first intake air chamber is disposed on the side of the engine and the second intake air chamber is disposed above the top of the engine.

By providing an induction system which has one intake air chamber on the side of the engine and another intake chamber above the top of the engine, the motorcycle takes advantage of two different spaces adjacent the engine which are available for culminating induction system components. For example, in a motorcycle having a V-type engine, the present induction system provides a large effective volume, without interfering with the space between the cylinders which can be used to accommodate throttle bodies.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
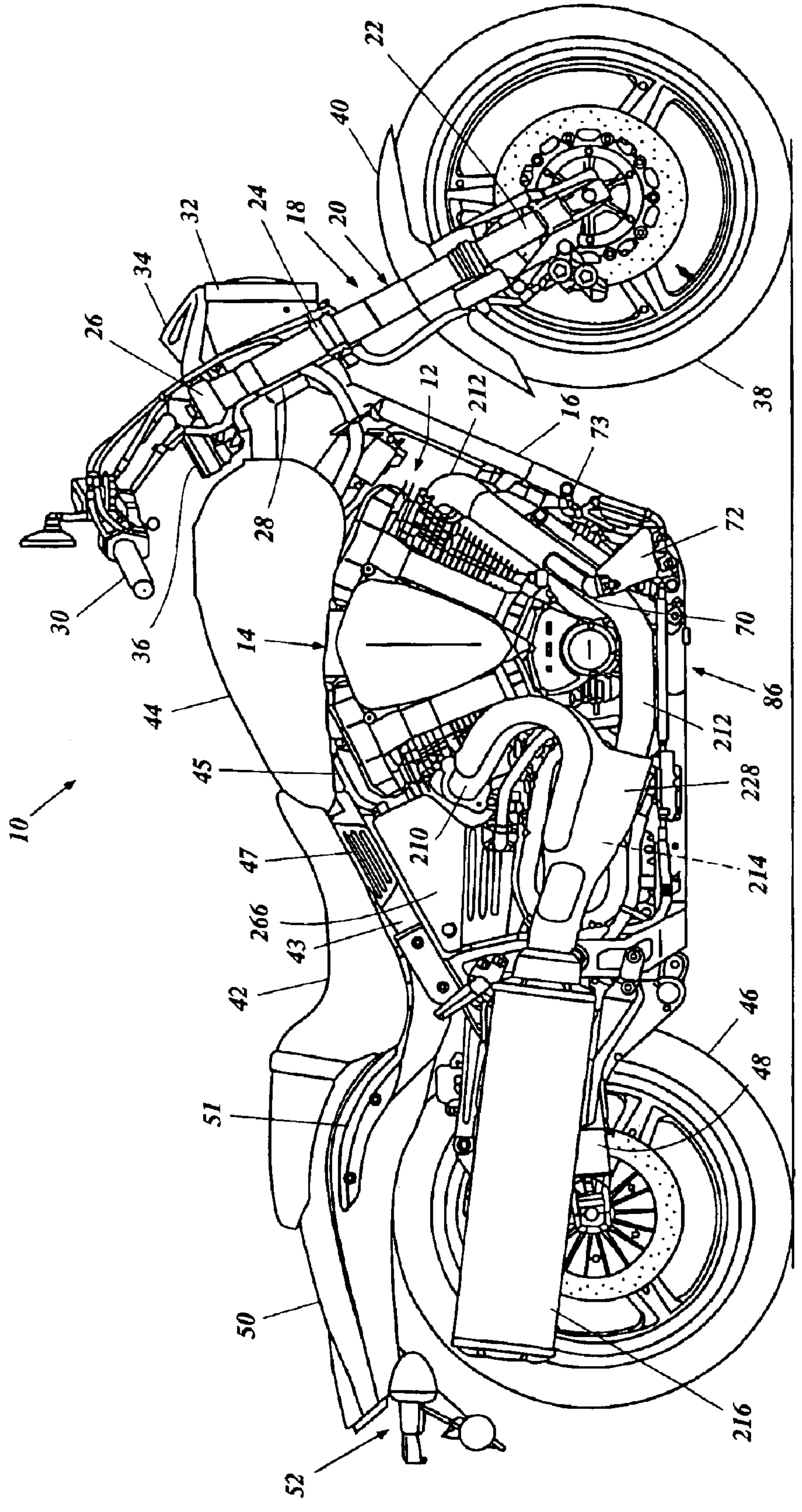
FIG. 1 is a right side elevational view of a motorcycle constructed in accordance with certain features, aspects, and advantages of the present invention.

With reference to FIG. 1, a motorcycle is illustrated in side elevation view and is identified generally by the reference numeral 10. The motorcycle 10 is powered by an internal combustion engine 12 having an induction system 14 which is constructed in accordance with certain features, aspects and advantages of the present invention. The motorcycle 10 is shown as a typical embodiment in which the present invention can be used.

As is known to those of ordinary skilled in the art, the motorcycle 10 is generally comprised of a frame assembly 16. Preferably, the frame assembly 16 is of a double cradle type frame. The frame assembly 16 also supports a front fork assembly 18, also known as a "hand stand-type telescopic" fork assembly. The fork assembly 18 includes an outer tube 20 and an inner tube 22.

A bracket assembly includes a lower bracket 24 and an upper bracket 26 connecting the outer tubes 20 of the two front forks. Additionally, the bracket assembly is pivotally supported by a head tube 28 defined at a forward portion of the frame assembly 16.

A handlebar 30 is mounted to the bracket assembly. In particular, the handlebar 30 is mounted to the upper bracket 26 with a handlebar clamp 31, adjacent the upper bracket 26.

The handlebar 30 can carry a variety of controls. For example, the handlebar 30 can include a twist-grip-type throttle normally positioned on the right end of the handlebar 30, a front brake level disposed adjacent to the throttle grip, a clutch lever, typically disposed adjacent the left end of the handlebar, as well as a variety of other controls such as an engine kill switch, headlight switch, as well as other controls.

The bracket assembly also supports a headlight 32. The bracket assembly can also support additional gauges, such as, for example, but without limitation, a tachometer 34 and a speedometer 36.

A wheel 38 is journalled for rotation at a lower end of the fork assembly 18. Additionally, a front brake is also mounted to the wheel and partially supported by the lower end of the fork assembly 18. In the illustrated embodiment, the brake includes one disk for each side of the front wheel 38 and one caliper for each disk. Additionally, a fender 40 is supported above the front wheel 38.

A rider's seat 42 is disposed rearwardly from the handlebar 30 and is supported by a seat rail 43. A leg protector 47 is mounted on each side of the motorcycle 10 on the seat 43 rail to protect the rider's legs. Thus, a rider can steer the motorcycle 10 when seating on the seat 42 by rotating the handlebar 30, holding each end of the handlebar 30 with one hand.

A fuel tank 44 is supported by a tank rail 45 of the frame 16 and is disposed forwardly from the seat 42, between the seat 42 and the handlebar 30. However, a decorative cover similar in shape to the fuel tank 44 could be installed in this position in lieu of the gas tank 44, with the gas tank located in another position.

The rear wheel 46 is journaled by the frame assembly 16 in any suitable manner. The rear wheel preferably is attached to the frame assembly 16 with a rear arm 48. The illustrated rear arm 48 is supported by a rear arm bracket 49 (FIG. 2) to pivot relative to frame assembly 16 above the pivot shaft (not shown). Preferably, a rear fender 50 is suspended above at least a portion of the rear wheel 46 by a fender bracket 51 in a manner well known to those of the ordinary skilled in the art. Additionally, a taillight unit 52 is supported by the rear fender 50. The taillight unit 52 preferably includes a set of turn signals, a support for a license plate, and a license plate light (not shown).

Figure 2:
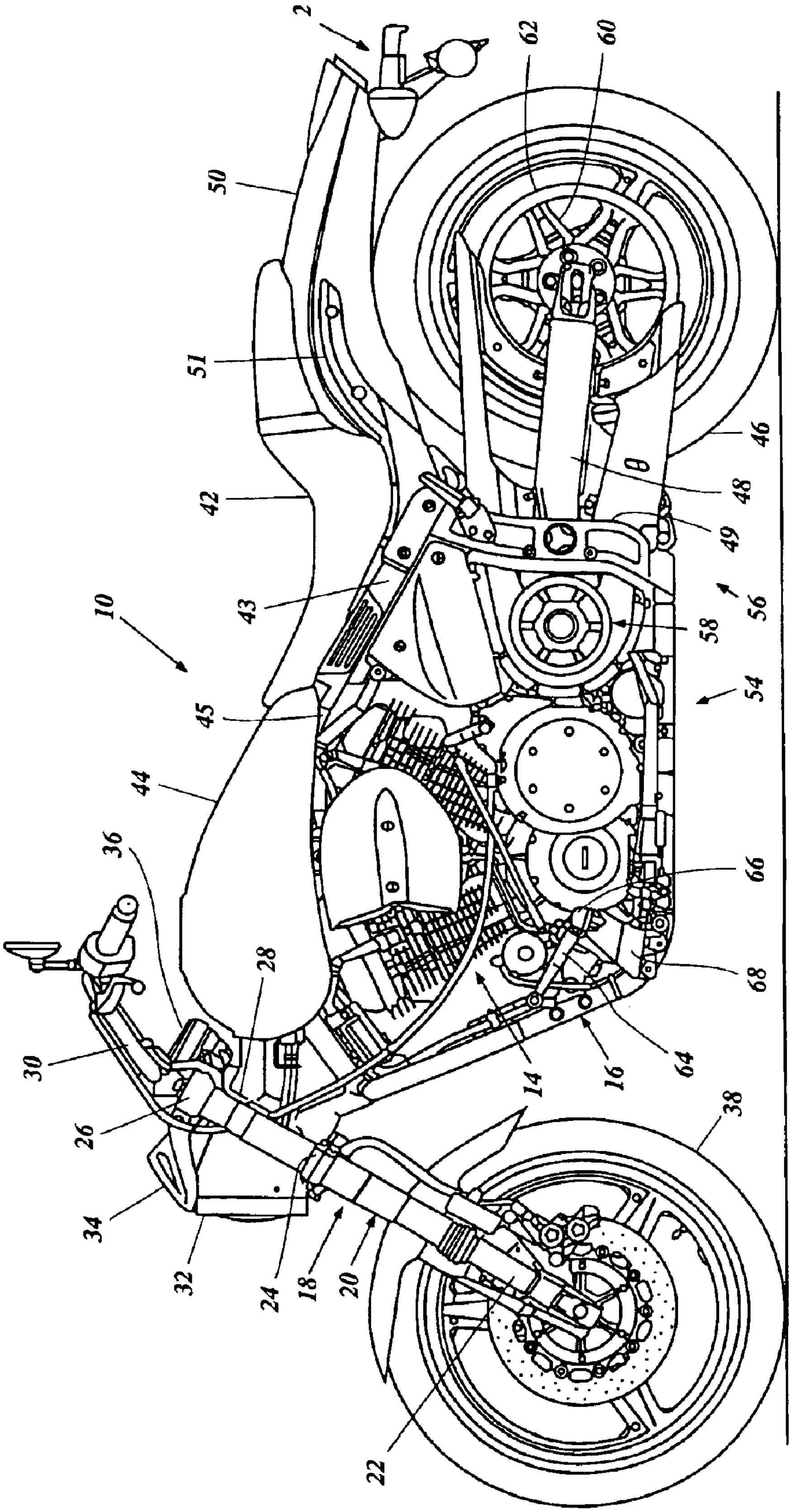
FIG. 2 is a left side elevational view of the motorcycle shown in FIG. 1.
Figure 3:
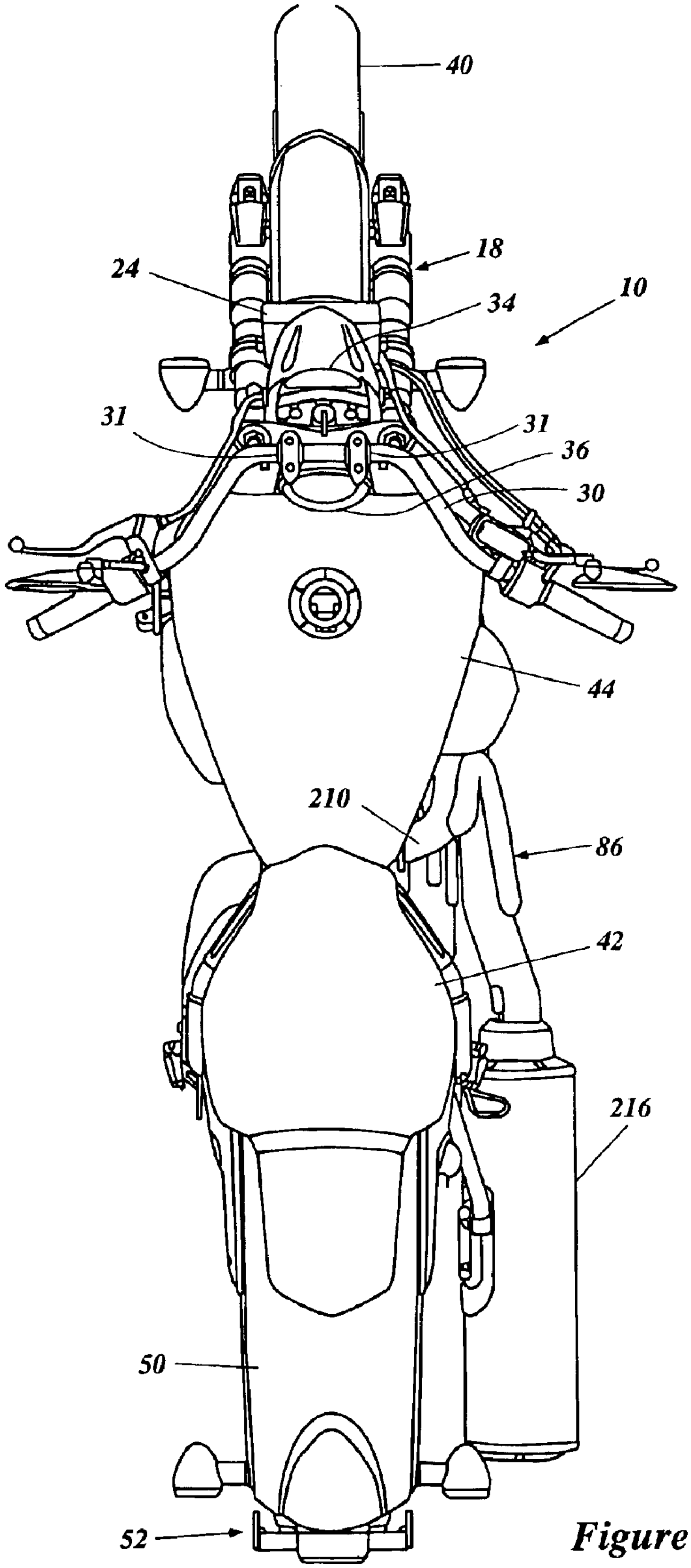
FIG. 3 is a top plan view of the motorcycle shown in FIG. 1.

The illustrated rear wheel 46 is driven by a transmission 54 (FIG. 2). A portion of the transmission 54 is contained at least partially within a crankcase transmission assembly of the engine 14. The transmission 54 drives the rear wheel 46 through a final drive assembly 56.

The final drive assembly 56 includes a drive sprocket 58 which is driven by a crankshaft (not shown) of the engine 14 through plurality of gear sets defining a speed change transmission. The final drive 56 also includes a driven sprocket 60 mounted to the rear wheel 46. A flexible transmitter 62 such as a tube rubber belt is wound around the drive sprocket 58 and a driven sprocket 60.

Transmission 54 also includes a gear shifter 64 for shifting the transmission 54 between different gear ratios defined by the gears disposed therein. The gear shifter 64 is disposed adjacent to a left foot rest 66 which is supported by foot rest bracket 68. Thus, operators can shift the transmission 54 using their left foot. Similar to the foot rest 66, a right side foot rest 70 is supported on the right side of the motorcycle 10 by a foot rest bracket 72. A rear brake pedal 73 is pivotally mounted near the foot rest 70 such that an operator can operate the rear brake pedal 73 with the operator's right foot. Thus, as operators straddle the seat 42, they can rest their feet on the foot rests 66, 70.

Figure 4:
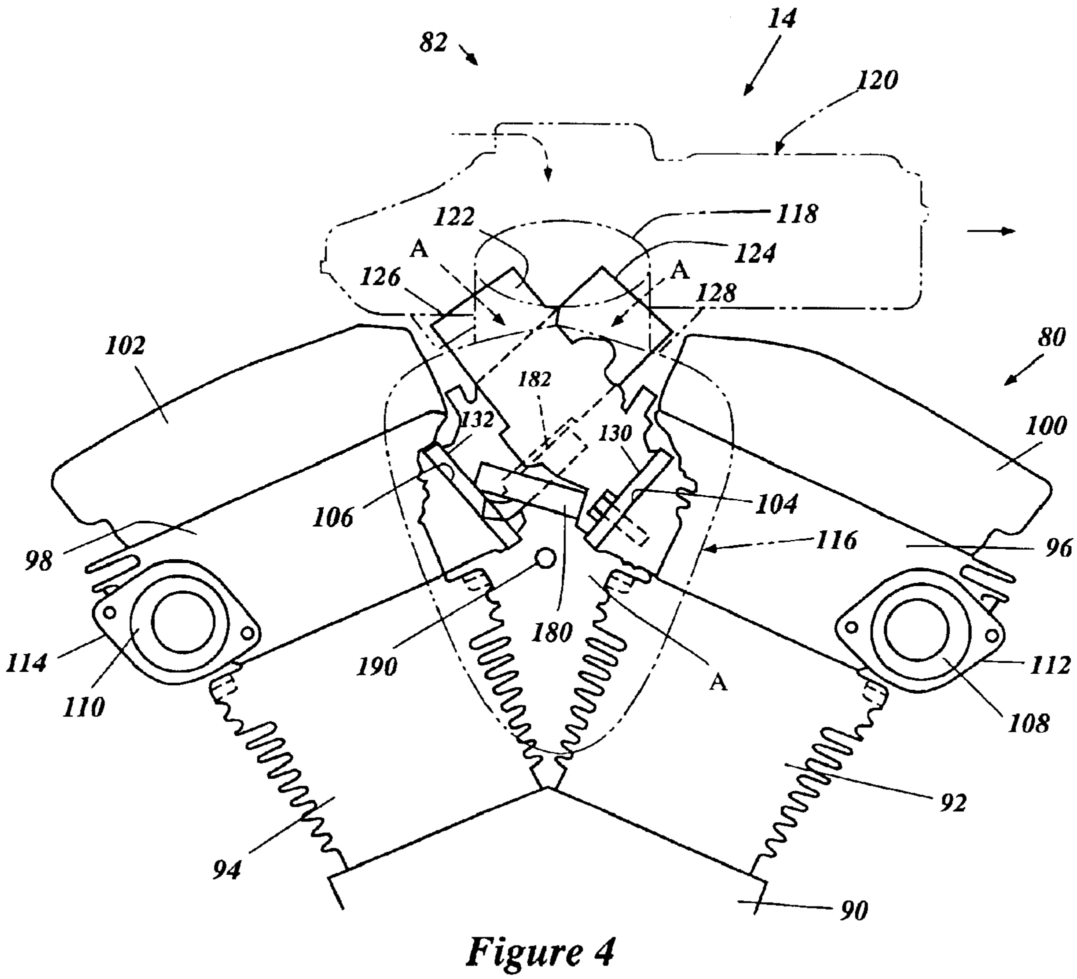
FIG. 4 is an enlarged right side elevational view of the engine from the motorcycle shown in FIG. 1, throttle bodies being disposed between the cylinders, the exhaust system being removed, and the induction system shown in phantom.

With reference to FIG. 4, the engine 14 is a V-twin type engine operating on a four-cycle principle. To this end, the engine 14 includes an engine body 80 which cooperates with a number of systems in order to provide power output. These systems include an induction system 82 (FIGS. 4, 5, and 16–18), a fuel system 84 (partially illustrated in FIGS. 6 and 7), an exhaust system 86 (partially illustrated in FIGS. 8 and 9), a lubrication system 88 (partially illustrated in FIGS. 10–13), an ignition system (not shown), and a feedback control system.

With reference to FIG. 4, the engine body 80 includes a crankcase 90, a pair of cylinder blocks 92, 94, a pair of cylinder heads 96, 98, and cylinder head covers 100, 102.

The crankcase 90 rotatably supports and journals a crankshaft (not shown) for rotation therein. The cylinder blocks 92, 94 are mounted to the crankcase 90 at an angle relative to one another. The cylinder blocks 92, 94 each define a cylinder bore (not shown) therein. A piston (not shown) reciprocates within each cylinder bore.

The pistons are connected to the crankshaft with piston rods. As such, the pistons reciprocate within their respective cylinder bores thereby driving the crankshaft in a rotating direction.

Each of the cylinder heads 96, 98 includes recesses on their respective lower surfaces (not shown). The recesses are in line with the cylinder bores defined within the cylinder blocks 92, 94. Together, the cylinder bores, the recesses, and the heads of the piston define combustion chambers (not shown).

Within each of the cylinder heads 96, 98, inner intake passages are defined which extend to the recesses defined on the lower surface of the cylinder heads 96, 98. The intersections of the inner intake passages with the recesses define inner intake ports. The terminal ends of the inner intake passages on the outer surfaces of the heads 96, 98 define outer intake ports 104, 106, respectively. In the illustrated embodiment, the outer intake ports 104, 106 are disposed on the sides of the cylinder heads 96, 98 which face inwardly toward each other.

Intake valves (not shown) are disposed at the inner intake ports of each cylinder heads 96, 98. The engine 14 is a pushrod-type engine. Thus, at least one camshaft is rotatably journaled within the crankcase 90. The camshaft is driven by the crankshaft through a gear reduction (not shown). An arrangement of pushrods operates the intake valves to open and close the inner intake ports at a desirable timing. Alternatively, the engine 14 can be configured as an overhead cam engine. In such an arrangement, the camshafts are jounaled in each of the cylinder heads 96, 98 so as to drive the intake valves The cylinder heads 96, 98 also define inner exhaust passages (not shown). The inner ends of the exhaust passages terminate in the recesses in the lower surfaces of the cylinder heads 96, 98. The intersection of the inner exhaust passages with the recesses define inner exhaust ports (not shown). The outer ends of the inner exhaust passages terminate on the right side of the cylinder heads 96, 98. The intersection of the inner exhaust ports and the outer surface of the cylinder heads 96, 98, define outer exhaust ports 108, 110. Similar to the intake valves, exhaust valves (not shown) are disposed in the cylinder heads 96, 98 and are operated by the pushrods.

Mounting flanges 112, 114 are mounted to the periphery of the exhaust ports 108, 110, respectively. The mounting flanges 112, 114 provide mounting surfaces for connections to exhaust pipes, described in greater detail below.

The induction system 82 is configured to guide air into the combustion chambers of the engine 14. In the illustrated embodiment, the induction system 82 includes a first intake air chamber 116, a conduit 118, a second intake air chamber 120, and two throttle body assemblies 122, 124. Together, the first intake air chamber 116, the conduit 118 and the second intake air chamber 120 define an induction silencing and filter arrangement disclosed in greater detail below with reference to FIGS. 16–18.

The throttle body assemblies 122, 124 include inlet ends 126, 128 which are open to the interior of the second intake air chamber 120. Additionally, the throttle body assemblies 122, 124 include outlet ends 130, 132, respectively, connected to the outer intake ports 104, 106, respectively.

Figure 7:
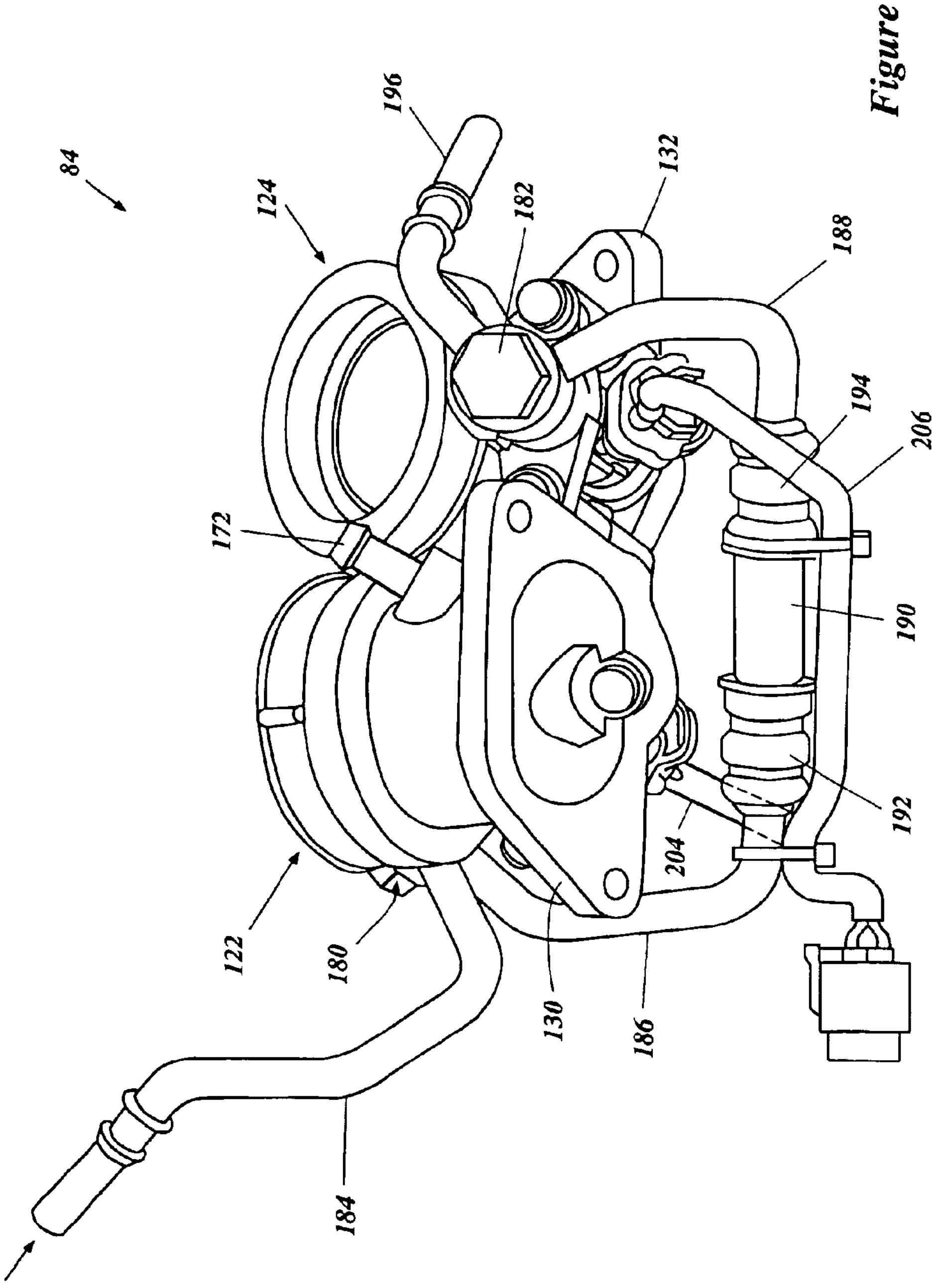
FIG. 7 is a perspective view of the throttle bodies of FIG. 6 illustrating fuel line connections thereto.

With reference to FIG. 7, each of the throttle assemblies 122, 124, as schematically represented in FIG. 7, include an inlet sleeve 134 which defines the inlets 126, 128. A lower end of the sleeves 134 extend downwardly from the second intake air chamber 120 and mate with a throttle passage 136. Preferably, the sleeves 134 are made of a flexible material. The throttle valve passage 136 preferably is made from a more rigid material.

Figure 5:
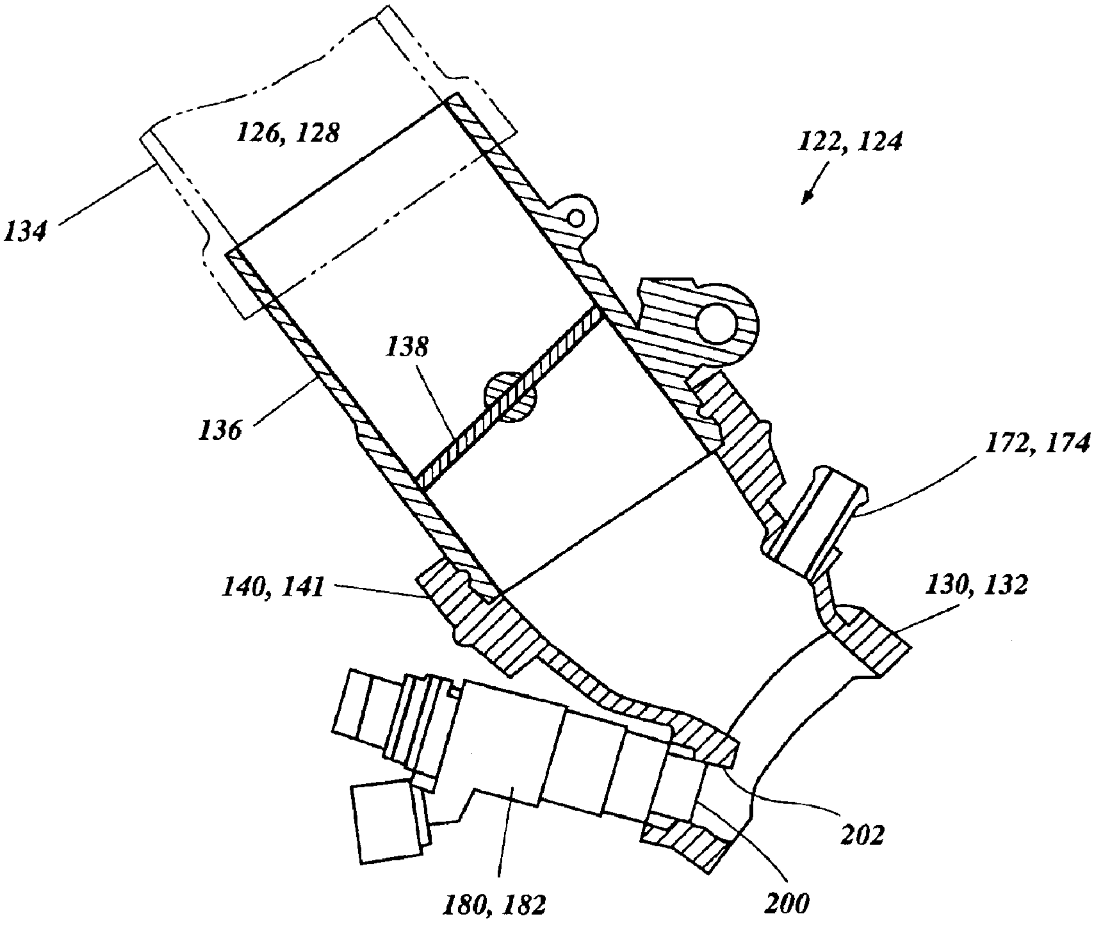
FIG. 5 is a sectional view of one of the throttle bodies shown in FIG. 4 and showing the fuel injector in solid line.

With reference to FIG. 5, the throttle valve portion 136 rotatably journals a throttle valve 138. The throttle valve 138 is configured to meter a flow of air therethrough. In the illustrated embodiment, the throttle valve 138 is a butterfly-type valve which, when in a closed position, prevents substantially all air flow through the throttle valve passage 136. A downstream end of the throttle valve passage 136 is connected to an upper end of a throttle joint assembly 140. The lower end of the throttle joint assembly 140 defines the outlet ends 130, 132 of the throttle bodies 122, 124.

As noted above, the throttle valve 138 is rotatably journaled within the throttle valve passage 136. The throttle valve 138 is connected to the throttle grip disposed on the handlebar 30 in a known manner. In the illustrated embodiment, the throttle valves 138 are connected to a common shaft. A pulley 139 (FIG. 6) is mounted to one end of the shaft. A cable (not shown) extends between the throttle grip and the pulley and thereby controls the movement of the throttle valves 138. As such, the greater the opening of the throttle valve 138, the more air A flows into the combustion chambers, and thus the greater the power output of the engine 14.

Figure 6:
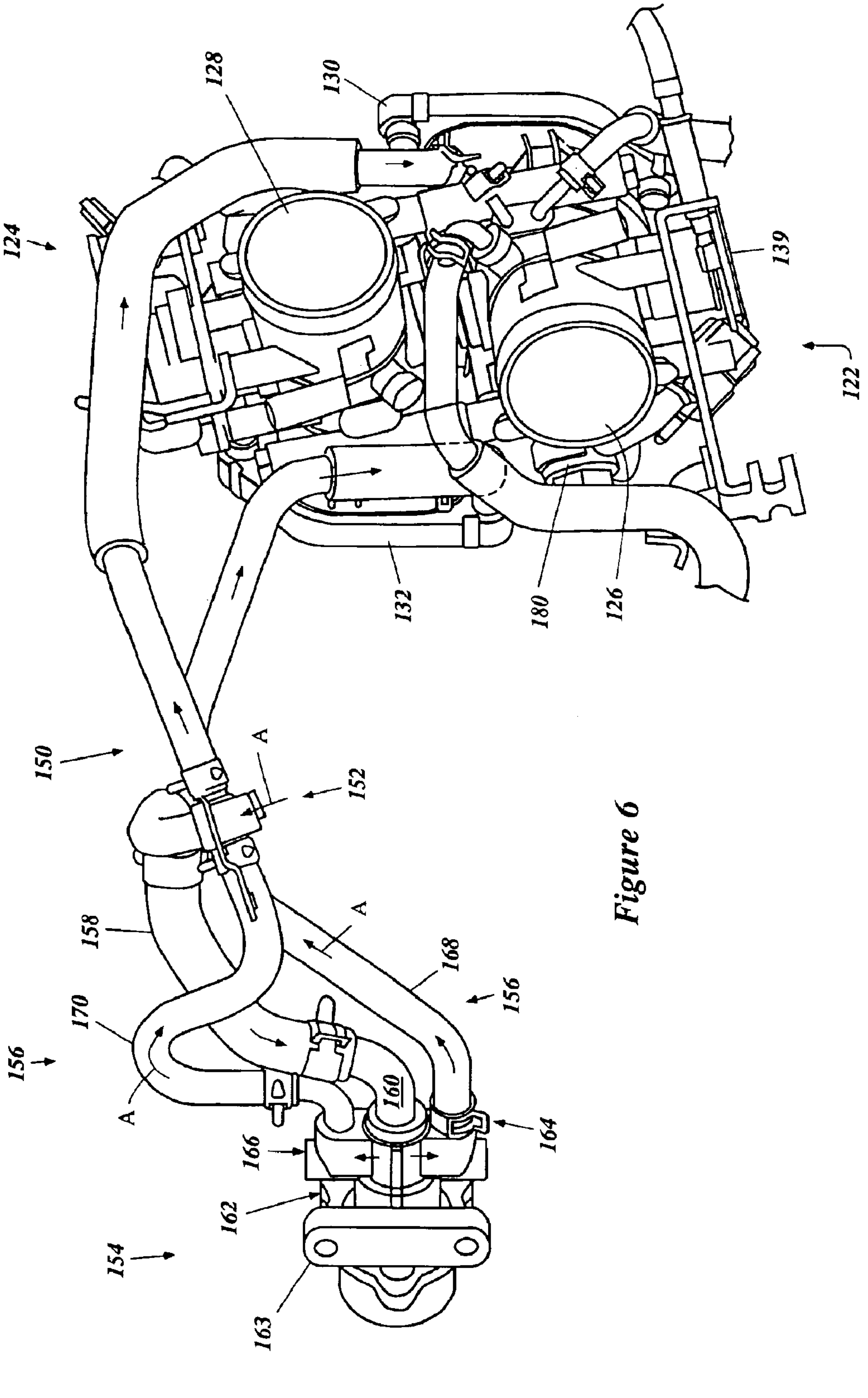
FIG. 6 is a top plan view of the throttle bodies removed from the engine of FIG. 4 and connected to an idle speed controller system.

With reference to FIG. 6, the induction system 82 also includes an idle speed control system 150. The idle speed control system 150 is configured to guide air into the induction system, downstream from the throttle valve 138. In the illustrated embodiment, the idle speed control system 150 includes an air supply 152, an idle speed air flow controller 154, and an idle speed air output 156.

The air supply 152, in the illustrated embodiment, is comprised of an air hose 158. The air hose 158 has an inlet end connected to the induction system 82. Preferably, the inlet of the air hose 158 is connected to the second intake air chamber 120 so as to communicate with an interior volume defined within the second intake air chamber 120. The outlet end of the hose 158 is connected to an inlet 160 of the idle speed air flow controller 154.

The idle speed air flow controller 154 includes a linear control valve 162. The linear control valve 162 is mounted to the frame 16 with a bracket 163 and includes a valve member (not shown) driven by a stepper motor (not shown). The stepper motor controls the movement of the valve so as to open and close internal passages which connect the inlet 160 with an outlet of the control valve 162. In the illustrated embodiment, the control valve 162 includes a first outlet 164 and a second outlet 166.

Preferably, the control valve 162 is configured to provide proportional control over the internal passages connecting the inlet 160 with the outlets 164, 166. It is to be noted that the stepper solenoid could also be used in place of the stepper motor to control the movement of the valve within the control valve 162.

The outlets 164, 166 are connected to delivery hoses 168, 170. The outlet ends, the air hoses 168, 170 are connected to the throttle bodies 126, 128, respectively, downstream from the throttle valves disposed therein. In particular, with reference to FIG. 5, the throttle bodies 126, 124 each include an idle speed air inlet 172, 174, respectively. The hoses 168, 170 are connected to the inlet 172, 174, respectively.

In operation, air is supplied to the idle speed control system 150 to the air supply 152. Under control of the stepper motor within the idle speed air flow controller 154, the linear valve proportionally opens and closes the internal openings between the inlet 160 and the outlet 164, 166. The movement of the stepper motor is controlled preferably by an electronic control unit (ECU) (not shown) which is part of a feedback control system for controlling the operation of the engine 14, described in greater detail below.

By allowing air to flow from the inlet 160 to the outlets 164, 166, the idle speed air flow controller 154 allows air to flow into the induction system 82 downstream from the throttle valves 138. Thus, when the throttle valves 138 are closed, or substantially closed, the air A flows into the combustion chambers. Additionally, movement of the stepper motor provides a proportional change in the openings between the inlet 160 and the outlets 164, 166, thereby providing controlled air flow flowing into the induction system through the inlets 172, 174 (FIG. 5). Thus, the controller 154 can change the speed of the engine 14 without a corresponding movement of the throttle valves 138.

With reference to FIG. 7, the fuel supply system is configured to direct fuel into the air flowing through the induction system 82 and the internal passages defined within the cylinder heads 96, 98. In the illustrated embodiment, the fuel supply system 84 operates under a port fuel injection principle. However, other types of fuel delivery systems can be used. For example, the fuel supply system 84 could incorporate carburetors or direct fuel injection.

The fuel supply system 84 includes the fuel tank 44 (FIG. 1), a fuel pump arrangement (not shown) and fuel injectors 180, 182. Preferably, the fuel pump arrangement includes at least one fuel pump mounted either in the fuel tank 44 or sub-fuel tank (not shown) defined within the fuel tank 44 or separately therefrom. Additionally, the fuel pump preferably is configured to pressurize the fuel to a pressure appropriate for fuel injection. An inlet of the fuel injector 180 is connected to the fuel pump by a fuel line 184. Preferably, the fuel line 184 is metallic, and in particular, stainless steel.

The outlet of the fuel injector 180 is connected to a fuel line 186. An inlet of the fuel injector 182 is connected with a fuel line 188. Another fuel line 190 is connected to the fuel lines 186, 188 through fuel line joints 192, 194, respectively.

Preferably, the fuel lines 186, 188 are metallic, and in particular, stainless steel. Additionally, the fuel line 190 and the joints 192, 194 preferably are made of a rubber material.

An outlet of the fuel injector 182 is connected to a fuel return line 196. Preferably, the fuel line 196 is made of a metallic material, and in particular, stainless steel. Additionally, the fuel line 196 is connected to the fuel tank 44 through a pressure regulator (not shown).

With reference to FIG. 5, the fuel injectors 180, 182 are mounted to the boot portions 140, 141 of the throttle bodies 122, 124, respectively. Each fuel injector 180, 182 includes an injection nozzle 200 mounted in an injection aperture 202 defined in the boot portions 140, 141. The injection nozzles 200 are arranged so as to inject fuel into the induction passage defined by the throttle bodies 122, 124 and the inner induction passages defined in the cylinder heads 96, 98.

Each of the fuel injectors 180, 182 include an actuator therein for opening and closing a fuel valve within the fuel injectors 180, 182. For example, the fuel injectors 180, 182 can include a solenoid for opening and closing the valve which controls a flow of fuel through the discharge nozzles 200. The solenoids are powered, and thus controlled, via fuel injection control lines 204, 206, respectively. The fuel injection control lines 204, 206 are connected to the ECU. The ECU controls the timing and duration of fuel injection in accordance with a feedback control scenario, discussed below in greater detail.

In operation, fuel from the fuel tank 44 is pressurized by the fuel pump and delivered to the fuel line 184 under a pressurize appropriate for fuel injection. The pressurized fuel first reaches the fuel injector 180. Fuel that is not injected by the fuel injector 180 then flows to the fuel injector 182 through the fuel lines 186, 190, 188, in that order. The fuel flowing through these fuel lines which is not injected by the fuel injector 182, returns to the fuel tank through the fuel line 196 and the pressure regulator valve.

The circulation of excess fuel through the fuel injectors 180, 182 and the fuel lines 184, 186, 190, 188, 196, helps to cool the fuel injectors. Additionally, by providing a positive flow of excess fuel through these fuel lines and fuel injectors, there is less opportunity for the fuel to be heated through contact with the metallic fuel lines 184, 186, 188, 196, which pass in close proximity to the cylinder blocks 92, 94 and the cylinder heads 96, 98 of the engine 14. When fuel is heated, aspiration of gases trapped within the fuel is accelerated. Thus, maintaining the fuel at a lower temperature helps in preventing gases from aspirating out of the fuel.

Additionally, by using a rubber fuel line for the portion of the fuel passages that extend below the throttle bodies 122, 124, the fuel is further insulated from heat. For example, as shown in FIG. 7, the fuel line 190 extends beneath the throttle bodies 122, 124. With reference to FIG. 4, the fuel line 190, thus, is disposed in close proximity to both the cylinder blocks 92 and 94. As such, this portion of the fuel delivery system 84 is particularly susceptible to heating through the convection of hot air circulating around the cylinder blocks 92, 94 as well as radiation of heat from those components. By using a rubber fuel line 190 in this area, the fuel is further protected from heating.

Further, the repeated opening and closing of the valve within the fuel injector 180 causes fuel pressure waves to travel through the fuel line 186 toward the fuel injector 182. Additionally, the repeated opening and closing of the valve within the fuel injector 182 causes fuel pressure waves to travel through the fuel line 188 toward the fuel injector 180. Such pressure waves in the fuel delivery system 84 causes undesirable variations in the fuel injection flow discharged through the nozzles 200. Thus, by using a rubber fuel line 190 between the fuel injectors 180, 182, these pressure waves can be attenuated, thereby reducing the effect of the fuel pressure waves on the fuel injection rates. It is to be noted that other resilient materials can be used to form the fuel line 190.

Yet another advantage of using a flexible and/or resilient material for the fuel line 190, is that during insulation, the throttle body assemblies 122, 124 can be twisted relative to each other about the throttle valve shaft axis. Such manipulation makes it easier to align the flanges 130, 132 with the intake ports 104, 106.

It is also to be noted that by extending the fuel lines 186, 190, 188 through the space between the cylinder blocks 92, 94 and beneath the throttle bodies 122, 124, more space around and above the throttle bodies 122, 124 can be used for other components of the induction system 82, such as the second intake air chamber 120. Thus, this arrangement of fuel lines 186, 190, 188 effectively utilizes an area that is typically unused in a motorcycle.

Figure 8:
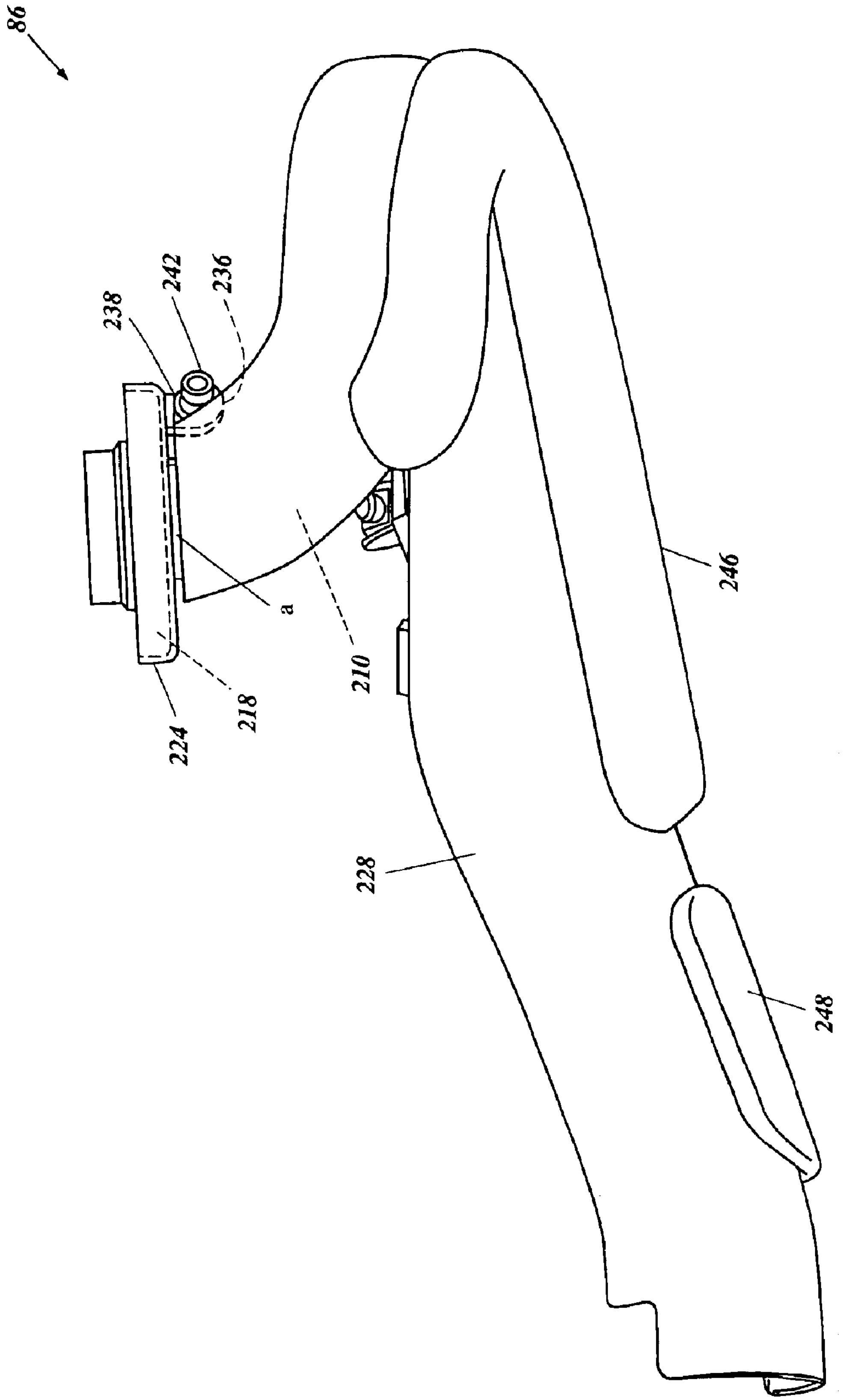
FIG. 8 is a top plan view of a forward portion of the exhaust system of the motorcycle shown in FIG. 1.
Figure 9:
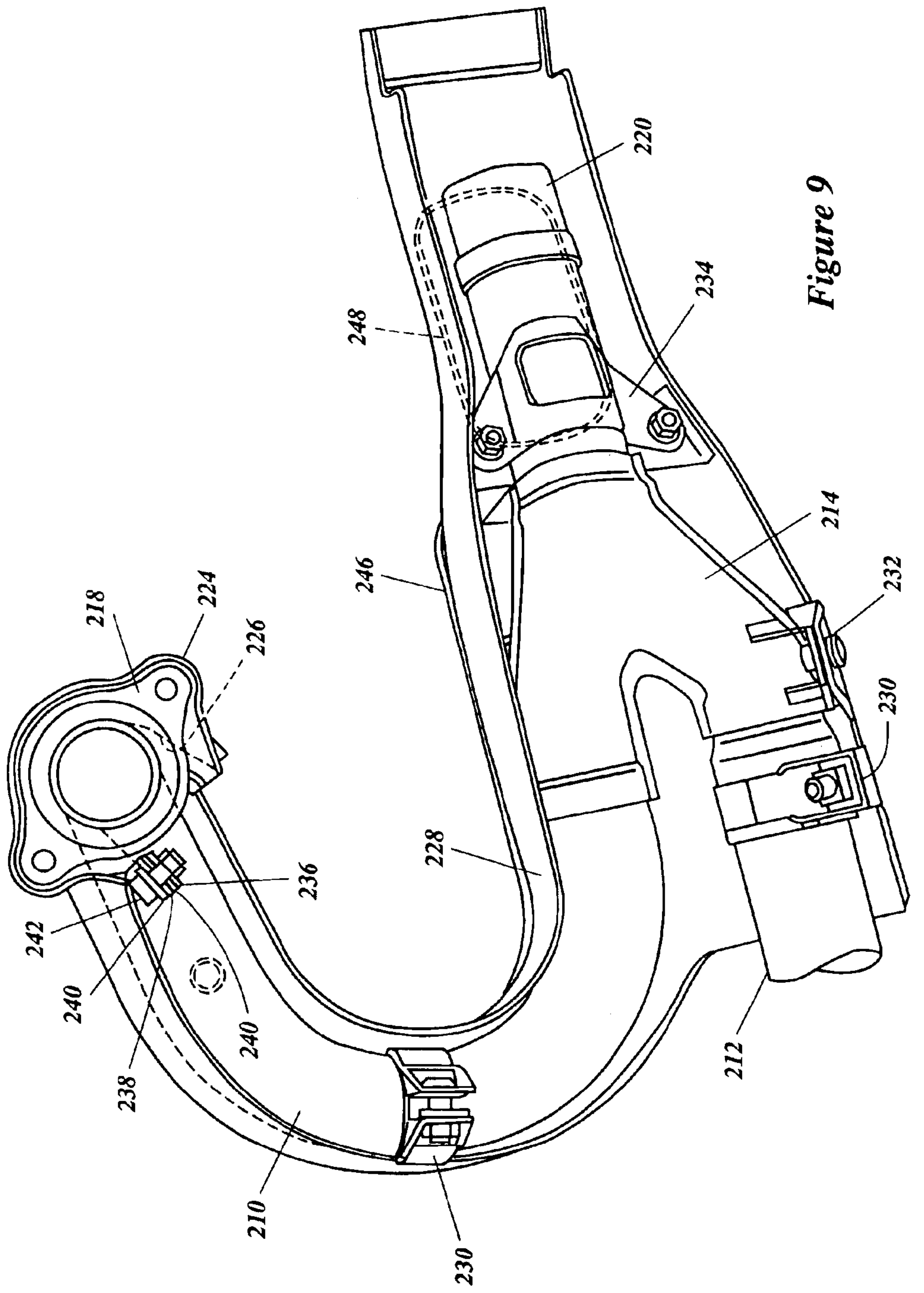
FIG. 9 is a right side elevational view of the exhaust system shown in FIG. 8.

With reference to FIG. 1, the exhaust system 86 includes individual exhaust header pipes 210, 212, a merging chamber 214, and a muffler 216. With reference to FIGS. 8 and 9, the header pipe 210 is connected to the exhaust port 110 of (FIG. 4) of the rear cylinder head 98 through the cooperation of the exhaust flange 114 and the exhaust pipe flange 218.

The flanges 114, 218 are connected with the plurality of bolts (not shown). As such, the internal exhaust passage defined within the cylinder head 98 is connected to the internal exhaust passage defined within the exhaust header pipe 210. The exhaust header pipe 212 is connected to the exhaust port 108 in the same manner using the exhaust flange 112.

As shown in FIG. 1, the exhaust header pipe 210 extends forwardly from the exhaust port 110 and then curves rearwardly toward the merging portion 214. The header pipe 212 extends from the exhaust port 108 with a larger radius curvature than that of the header pipe 210, and also connects to the merging portion 214.

The merging portion 214 preferably is shaped to provide some silencing. The outlet of the merging portion 214 is connected to the muffler 216 through an exhaust pipe 220.

In operation, as fuel and air charges delivered to the combustion chambers from the fuel and induction systems 84, 82, respectively, are combusted, the exhaust gases generated therefrom are discharged from the exhaust ports 108, 110 into the header pipes 212, 210, respectively. The exhaust gases travel through the header pipes 210, 212, and through the merging portion 214, in which the exhaust gases expand and are combined, thereby attenuating some of the acoustical energy travelling therewith. The exhaust gases exit the merging portion 214 through the exhaust pipe 220 and are further silenced in the muffler 216.

With continued reference to FIGS. 1, 8, and 9, the exhaust system 86 includes an arrangement of heat shields. As shown in FIG. 8, flange shield 224 has a shape that is generally complimentary to the flange 218 and extends over the flange 218 as well as the flange 114. The flange cover 224 includes a notched portion 226 which receives the upstream end of the header pipe 210. Another flange cover (not shown) extends over the flange connecting the header pipe 212 to the exhaust port 108.0

The exhaust system 86 also includes a main heat shield body 228 which extends from a position proximate to the flange cover 224, over the merging portion 214, to a point adjacent the muffler 216. With reference to FIG. 8, a gap a preferably is defined between the main heat shield body 228 and the flange cover 224. Similarly, a gap preferably is defined between the main heat shield body 228 and the flange cover covering the flange 112.

The main heat shield body 228 is secured to various other portions of the exhaust system 86. For example, clamps 230 secure the upstream portions of the main body 228 to the individual header pipes 210, 212. Additionally, a portion of the main heat shield body 228 is mounted to the merging portion at a mount 232. Finally, a bracket 234 is used to secure the main heat shield body 228 to the exhaust pipe 220.

With reference to FIGS. 8 and 9, the flange cover 224 includes a mounting boss 236 extending outwardly from the flange 224 adjacent the notch 226. Additionally, the main heat shield body 228 includes a mounting boss 238 extending from an upstream and thereof and generally parallel to the mounting boss 236 of the flange cover 224. The mounting bosses 236, 238 are connected with a plurality of washers 240 and a bolt 242 as illustrated in FIG. 9. Thus, the flange cover 224 is supported by the main heat shield member 228. Preferably, the main heat shield member 228, the flange cover 224, and the flange cover covering the exhaust flange 112, provided with a polished outer surface thereby enhancing the overall exterior appearance of the exhaust system 86.

Additionally, forward and rearward heat shield members 246, 248 are mounted to an exterior of the main heat shield member 228. The additional heat shield members 246, 248 provide additional protection to the legs and clothing of an operator of the motorcycle 10.

With reference to FIGS. 10–13, the lubrication system 88 preferably is a dry-sump-type lubrication system. As such, the lubrication system 88 includes a reservoir 250 for storing lubricant therein and two lubricant pumps (not shown) for circulating lubricant through the lubrication system 88.

Figure 11:
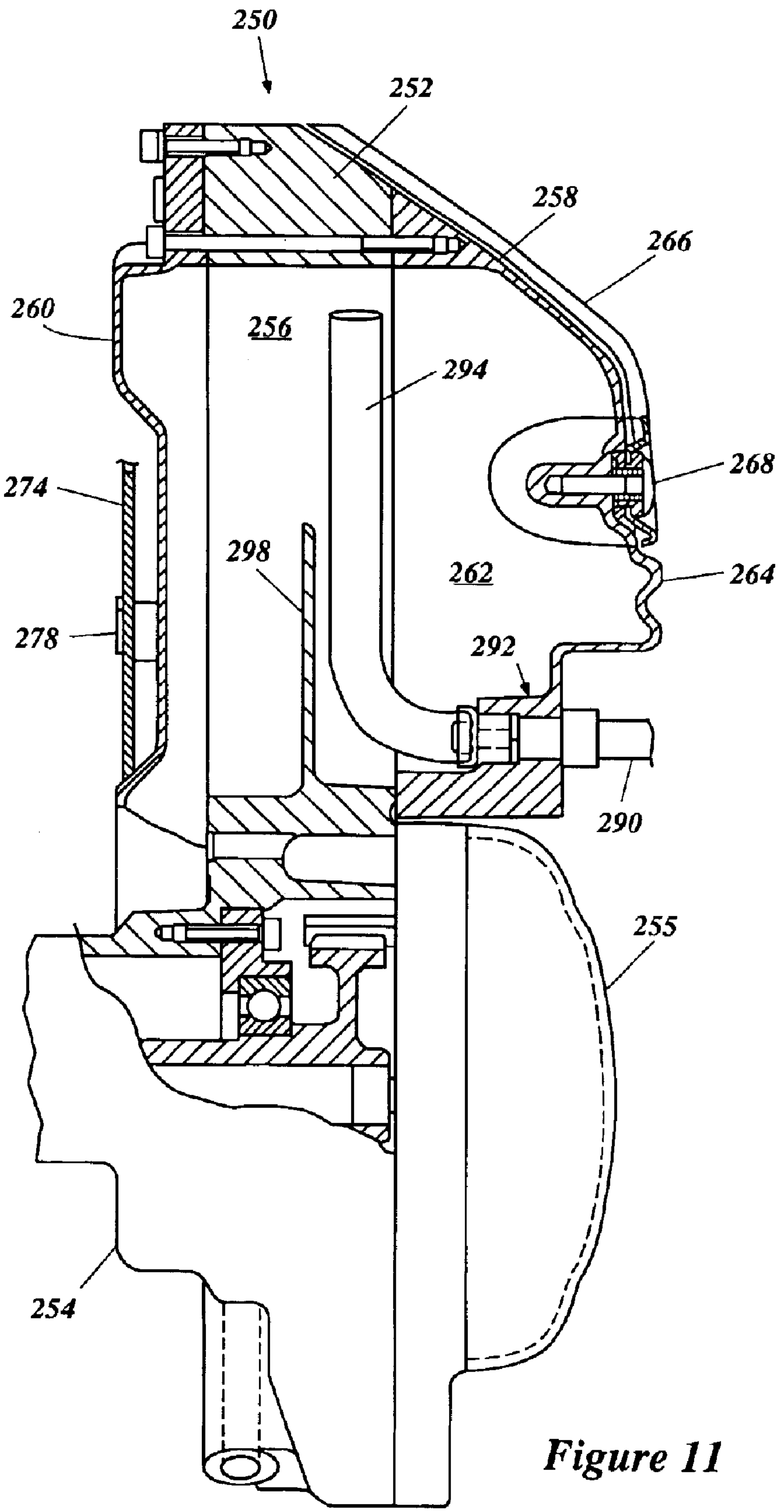
FIG. 11 is a partial sectional view of the lubricant reservoir shown in FIG. 10.

With reference to FIG. 11, the lubricant reservoir 250 is formed with three major components. A central body portion 252 of the reservoir 250 is made integrally with a portion of the transmission 54. In particular, the central body member 252 is made integrally with a transfer case 254 of the transmission 54. A cover 255 is mounted to the transfer case 254. As shown in FIG. 11, the central body portion 252 defines a large central aperture 256 extending from the right to the left side of the central body portion 252.

The lubricant reservoir 250 also includes an outer casing member 258 attached to the right side of the central body portion 252. The outer casing member 258 includes an inner face which sealingly engages with the right side of the aperture 256.

Additionally, the lubricant reservoir 250 includes an inner case member 260. A periphery of the inner case member 260 extends around the left side periphery of the aperture 256 and sealingly engages therewith. Thus, together the central body portion 252, the outer case member 258, and the inner case member 260 define an interior lubricant chamber 262.

Figure 10:
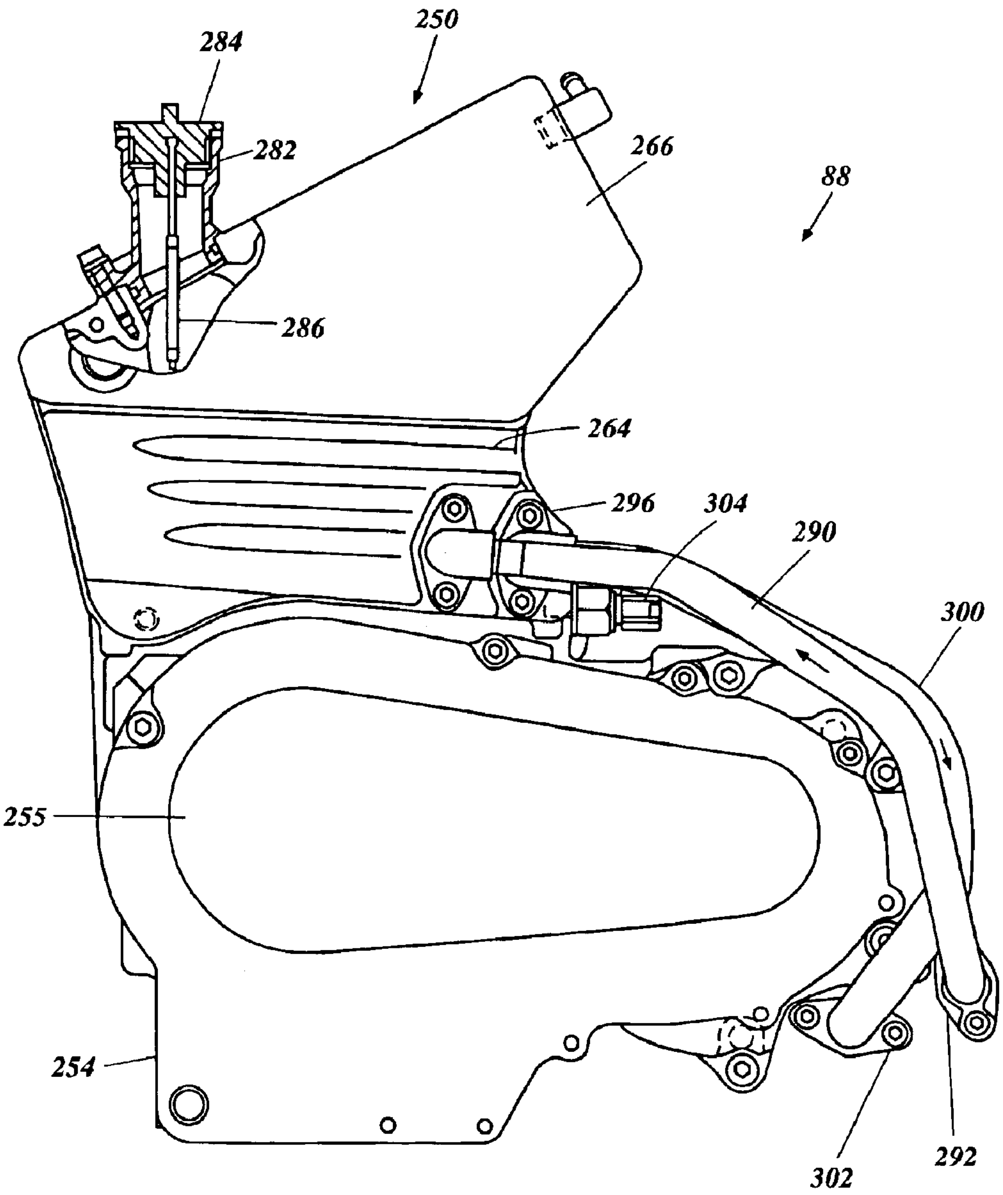
FIG. 10 is a right side elevational view of a transmission and lubricant reservoir from the motorcycle shown in FIG. 1.

As shown in FIGS. 10 and 11, the outer case member 258 includes ridges or “beads” 264 which extends generally longitudinally along the outer case member 258. The beads 264 provide additional surface area through which greater heat exchange can occur between lubricant within the lubricant reservoir 262 and the atmosphere. Above the beads 264, an outer heat insulation member 266 is mounted to the outer casing member 258. A bolt 268 secures the outer heat insulation member 266 to the outer casing member 258.

Figure 13:
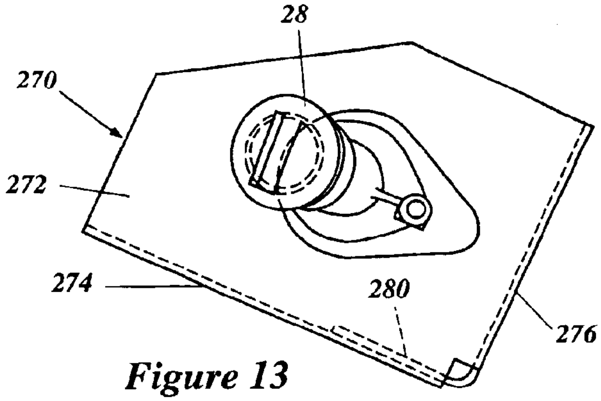
FIG. 13 is a top perspective view of the reservoir of FIG. 11, as viewed along arrow 12 shown in FIG. 11.
Figure 12:
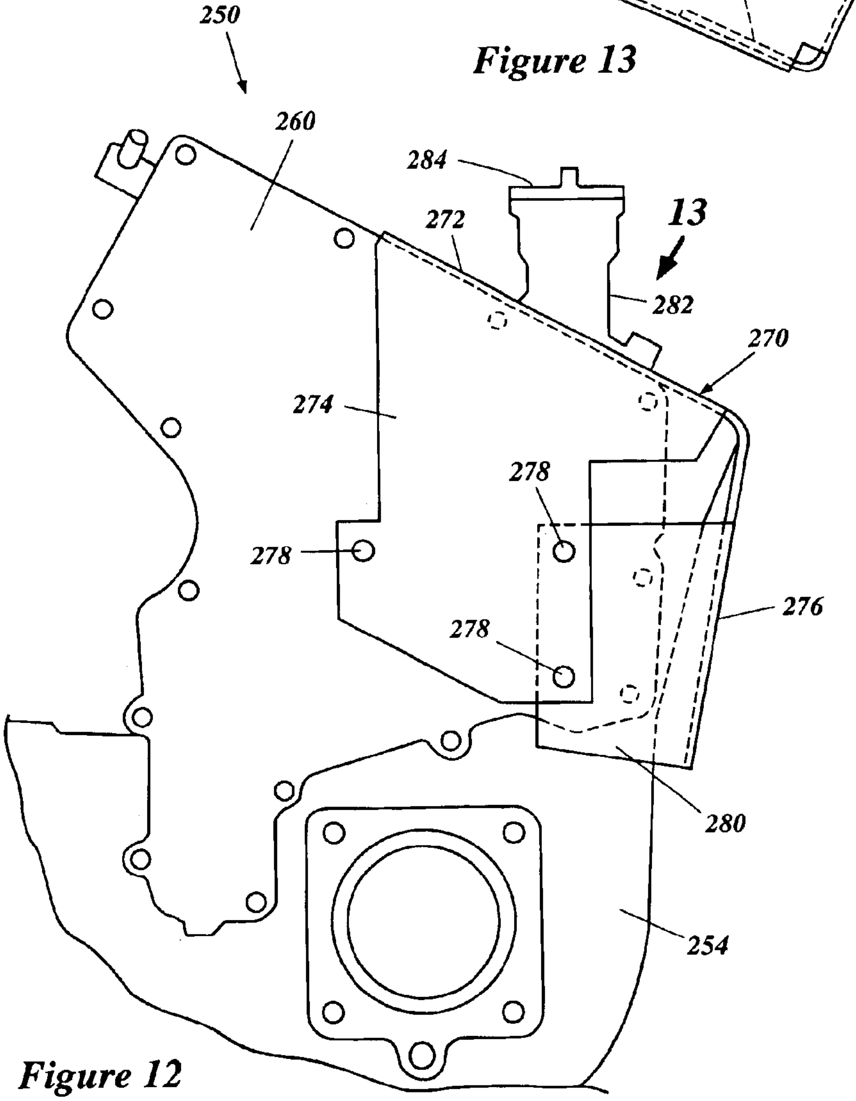
FIG. 12 is a right side elevational view of the oil reservoir of FIG. 10, with an outer cover removed.

With reference to FIGS. 11–13, the inner case member 260 defines a left sidewall of the reservoir 250. An additional heat insulation member 270 extends over a portion of the top of the lubricant reservoir 250, the left sidewall, and a portion of the rear wall. Preferably, the insulation member 270 is formed from a piece of sheet insulation material having a first portion 272 covering a portion of the upper wall of the lubricant reservoir 250, a second portion 274 extending over a portion of the inner case member 260, and a third portion 276 overlying a portion of the rear wall, of the lubricant reservoir 250.

As shown in FIG. 12, the insulation member can be secured to the lubricant reservoir with a plurality of rivets 278. Optionally, a portion of the third portion 276 can be folded forwardly so as to define a further inner portion 280 that can be overlapped by the second portion 274. Preferably, in this configuration, some of the rivets 278 can be used to secure the second portion 274 to the further portion 280.

With reference to FIGS. 10, 12, and 13, the lubricant reservoir 250 includes a lubricant refill opening 282 positioned to allow an operator or repair person to add lubricant to the lubricant reservoir 250. The upper end of the opening 282 is normally closed with a cap 284.

With reference to FIG. 10, a ullage rod 286 is attached to the cap 284 and extends downwardly into the interior volume 262 of the reservoir 250. As known in the art, by removing the cap 284 and the ullage rod 286, an operator or repair person can monitor the level of lubricant in the reservoir 250.

With reference to FIG. 10, a lubricant scavenge line 290 extends from a discharge port 292 of a scavenge pump of the lubrication system 88. As shown in FIG. 11, the scavenge line 290 is connected to an inlet 292 of the reservoir 250. preferably, the reservoir 250 includes a guide pipe 294 extending from the inlet 292 upwardly towards an upper portion of the interior volume 262.

By providing the guide pipe as such, lubricant initially entering the interior volume 262 is kept separate from a pool of lubricant within the interior volume 262 until reaching the outlet of the guide tube 294. This is advantageous because, firstly, gases trapped within lubricant flowing into the guide pipe 249 are prevented from mixing with lubricant pooled in the interior volume 262. Thus, by guiding lubricant entering the reservoir 250 through the guide tube 294, gases have the opportunity to a separate out of the liquid lubricant directly into an empty space above the level of lubricant within the interior volume 262. Additionally, the outlet 296 (FIG. 10) of the reservoir 250 is disposed adjacent to the inlet 292. Thus, the guide tube 294 prevents lubricant entering the reservoir from the inlet 292 from immediately exiting the reservoir 250 through the outlet 296. Thus, lubricant entering the reservoir 250 through the guide tube 294 circulates within the reservoir 250 before reaching the outlet 296.

Additionally, the reservoir 250 includes an internal wall 298 extending upwardly from the bottom of the reservoir 250 so as to form a partial partition within the interior volume 262. The wall 298 can thus further enhance the circulation of lubricant throughout the reservoir 250 before reaching the outlet 296. In the illustrated embodiment, the wall 298 is formed integrally with the main body portion 252 of the reservoir 250.

With reference to FIG. 10, the outlet 296 of the reservoir 250 is connected to feed pipe 300. The outlet of the feed pipe 300 is connected to an inlet 302 of the supply pump. The supply pump draws lubricant from the lubricant reservoir 250, through the supply line 300, then pressurizes and thus urges lubricant through numerous lubricant galleries defined within the engine 14 and the transmission 54. After the lubricant is circulated through the engine 14 and the transmission 54, the lubricant falls to a lower portion of the engine 14 and is again drawn back to the lubricant reservoir 250 by the scavenge pump.

With reference to FIG. 10, a lubricant temperature sensor 304 is mounted to the lubricant reservoir 250. A portion of the sensor 304 is exposed to the interior volume 262 of the reservoir 250. The sensor 304 is configured to detect a temperature of lubricant within the interior volume 262 and produce a signal indicative thereof. The sensor 304 is connected to the ECU through a lubricant temperature signal line (not shown). The ECU can be configured to use the signal from the sensor 304 in a feedback control system for controlling operation of the engine 14, described in greater detail below.

The motorcycle 10 also includes an ignition system (not shown). The ignition system can be powered by known power sources typically used for motorcycles. For example, the motorcycle 10 can include an AC generator driven by the engine 14 and a battery. The ignition system, which includes ignition coils (not shown) can draw power from the battery and/or the AC generator to supply power to sparkplugs (not shown) for combusting the air-fuel charges within the combustion chambers. Preferably, the coils are controlled by the ECU in accordance with the feedback control system.

The feedback control system, which utilizes the ECU, can control numerous operating parameters of the engine 14. For example, but without limitation, the feedback control system can include various maps, generally known in the art, for determining appropriate fuel injection and ignition data based on the output of various sensors. Such sensors can include, for example, but without limitation, the lubricant temperature sensor 304, as well as numerous other sensors such as a throttle position sensor, air pressure sensor, air temperature sensor, throttle position sensor, (not shown), as well as others.

The ECU can be configured to detect the output of the sensors, correlate these outputs with data from the control maps, and output control signals to the fuel injectors 180, 182 and the sparkplugs for proper fuel injection and ignition control. Additionally, the ECU can use the output of the lubricant temperature sensor 304 to control the idle speed control system 150.

Figure 14:
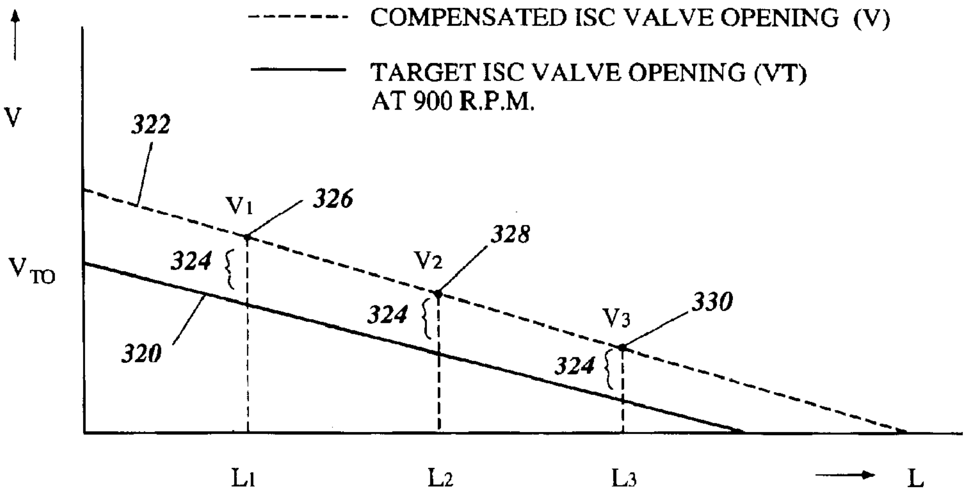
FIG. 14 is a map illustrating the relationship between idle speed controller valve opening V plotted on the vertical axis and oil temperature L on the horizontal axis.

For example, FIG. 14 illustrates data from a control map plotted on a two-dimensional graph. The vertical axis represents the opening V of the linear valve 166. The horizontal axis represents the temperature L of lubricant within the reservoir 250. The solid line in the graph of FIG. 14 illustrates an ideal movement of the valve 166 according to the temperature L of lubricant within the reservoir 250. In particular, the solid line 320 indicates the target ISC valve opening V to keep the engine 14 running at 900 rpm. As shown in FIG. 14, the idle speed control valve 166 would start from an opening $V_{T1}$ and gradually close as the temperature L of the lubricant increased. This movement of the ISC valve 166 would maintain the engine speed at 900 rpm.

The dashed line 322 on the graph 14 illustrates the compensated ISC valve opening V. For example, the line 322 represents a target ISC valve opening V, plus a predetermined amount 324. Thus, at the lubricant temperature L1 the compensated ISC valve opening V is V1. Similarly, at temperatures $L_2$ and $L_3$, the compensated ISC valve openings are $V_2$ and $V_3$, respectively. This data provides data points 326, 328, and 330.

Figure 15:
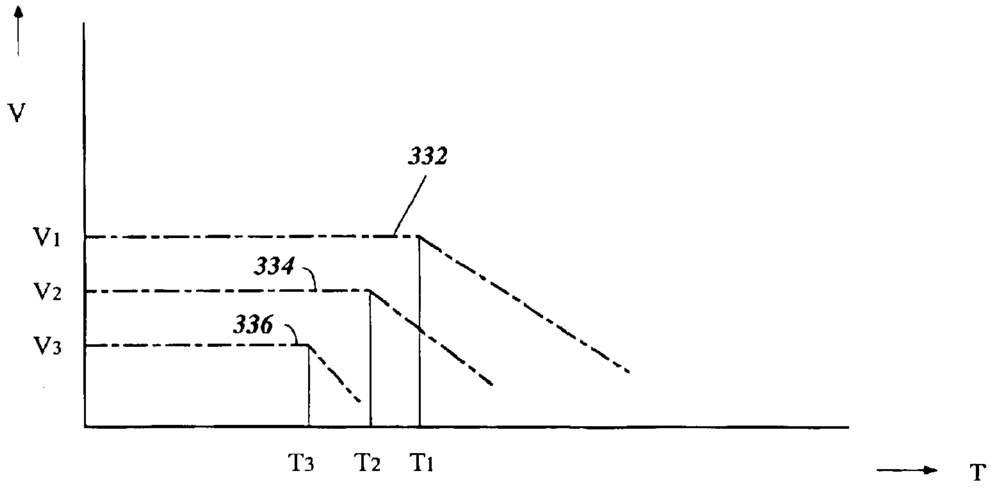
FIG. 15 is a graph illustrating the relationship between idle speed controller valve opening V plotted on the vertical axis and time T plotted on the horizontal axis.

With reference to FIG. 15, the feedback control system can use the data points 326, 328, and 330 in order to control the ISC system 150 in accordance with the output from the lubricant temperature sensor 304. For example, if the output from the lubricant temperature sensor 304 indicates a temperature less than or equal to temperature $L_1$, the ISC valve 166 opens to $V_1$ in accordance with the data point 326. Further, the ECU holds the ISC valve 166 at the opening $V_1$ for a time $T_1$. After the time $T_1$, elapses, the opening V is gradually reduced over time to a closed position. A schematic illustration of the movement of the ISC valve 166 is illustrated as line 332. Similarly, the movement of the ISC valve 166 when the output signal of the lubricant temperature sensor 304 corresponds to the temperatures $L_2$ and $L_3$ is illustrated as lines 334 and 336, respectively.

Thus, constructed as such, the ECU can sample the temperature of the lubricant within the reservoir 250 once when the ignition switch of the motorcycle 14 is turned on.

At that time, the ECU can sample the output from the sensor 304 and determine the proper ISC valve opening V, then operate the ISC control valve 166 to open the ISC valve to the opening V. The ECU can then hold the ISC valve 166 at the opening V until the predetermined time T has expired. Thereafter, the ECU can allow the ISC control valve 166 to gradually return to a closed position.

In this manner, the ECU can control the ISC valve 166 with relatively few operations. In contrast, a more complicated approach would be to continually sample the output of the lubricant temperature sensor 304 and continually move the ISC valve 166 smoothly from an initial opening to a closed position as the lubricant temperature rises. Such a scenario requires additional processing capacity and thus would require more expensive ECU.

Figure 16:
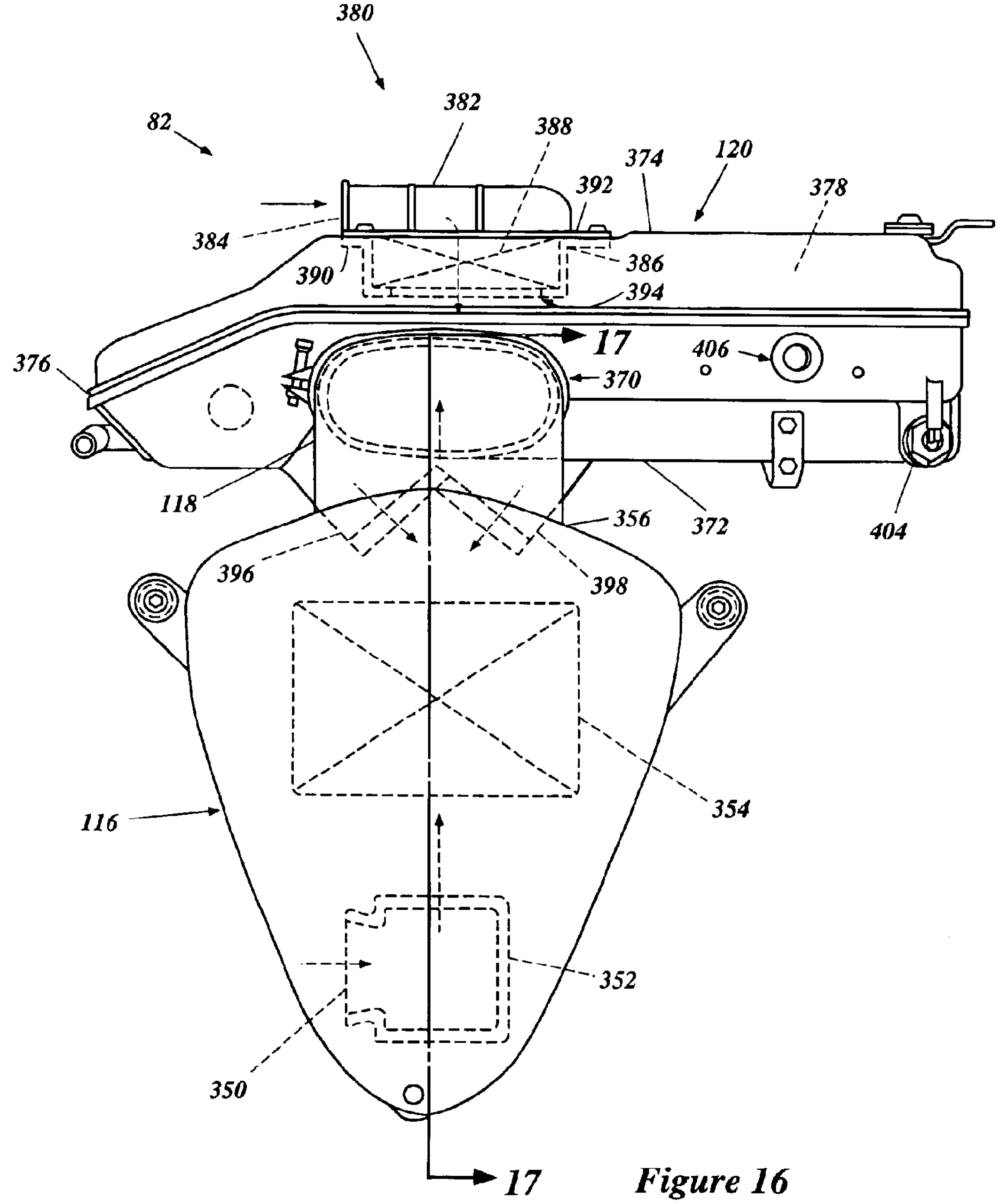
FIG. 16 is an enlarged right side elevational view of the induction system included in the motorcycle in FIG. 1.

With reference to FIGS. 4 and 16–18, the induction system 82 is described in greater detail. As shown in FIG. 16, the first induction air chamber 116 is generally triangular in shape in side elevational view.

The first intake air chamber 116 includes an inlet 350 disposed on an inner side thereof. Preferably, the inlet 350 leads to a first expansion chamber 352 defining an entrance to the first intake air chamber 116.

The first intake air chamber 116 also includes an air filter 354 through which air from the expansion chamber 352 passes before it reaches an outlet 356 disposed at a top of the first intake air chamber 116.

Figure 17:
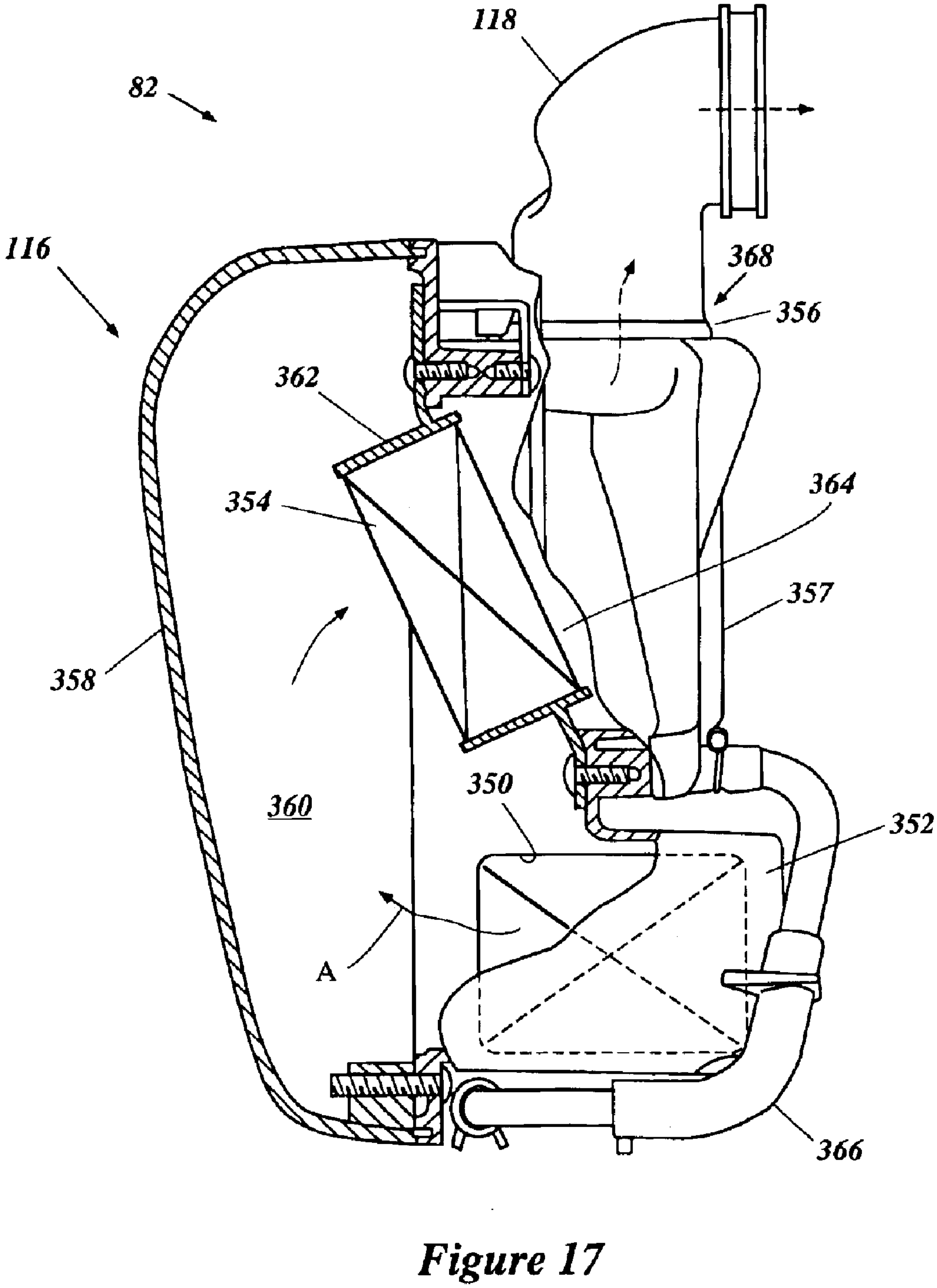
FIG. 17 is a sectional view of the first intake air chamber illustrated in FIG. 16 take along Line 17—17.

With reference to FIG. 17, the first intake air chamber 116 is formed of an inner main body portion 356 and an outer cover member 358. An interior volume 360 is defined between the main body portion 356 and the outer cover 358. Thus, induction air A flowing from the first expansion chamber 352 is further expanded upon entering the interior volume 360.

The filter 354 is mounted to the main body portion 356 via a flange member 362. The flange member 362 and the filter 354 define a partition within the first intake air chamber 116 and separates the interior volume 360 from a second interior volume 364. The outlet 356 is disposed at an upper end of the second chamber 364. As shown in FIG. 17, a drain hose 366 extends from a bottom portion of the chamber 364 to thereby allow liquids, such as fuel, to drain from the chamber 364.

The duct 118 has an inlet end 368 connected to the outlet 356 of the first intake air chamber 116. The duct 118 extends upwardly from the first intake air chamber 116 then curves horizontally to connect with an inlet 370 (FIG. 16) of the second intake air chamber 120. The duct 118 defines a cross-sectional flow area that is smaller than a cross-sectional flow area defined by the first intake air chamber 116.

Figure 18:
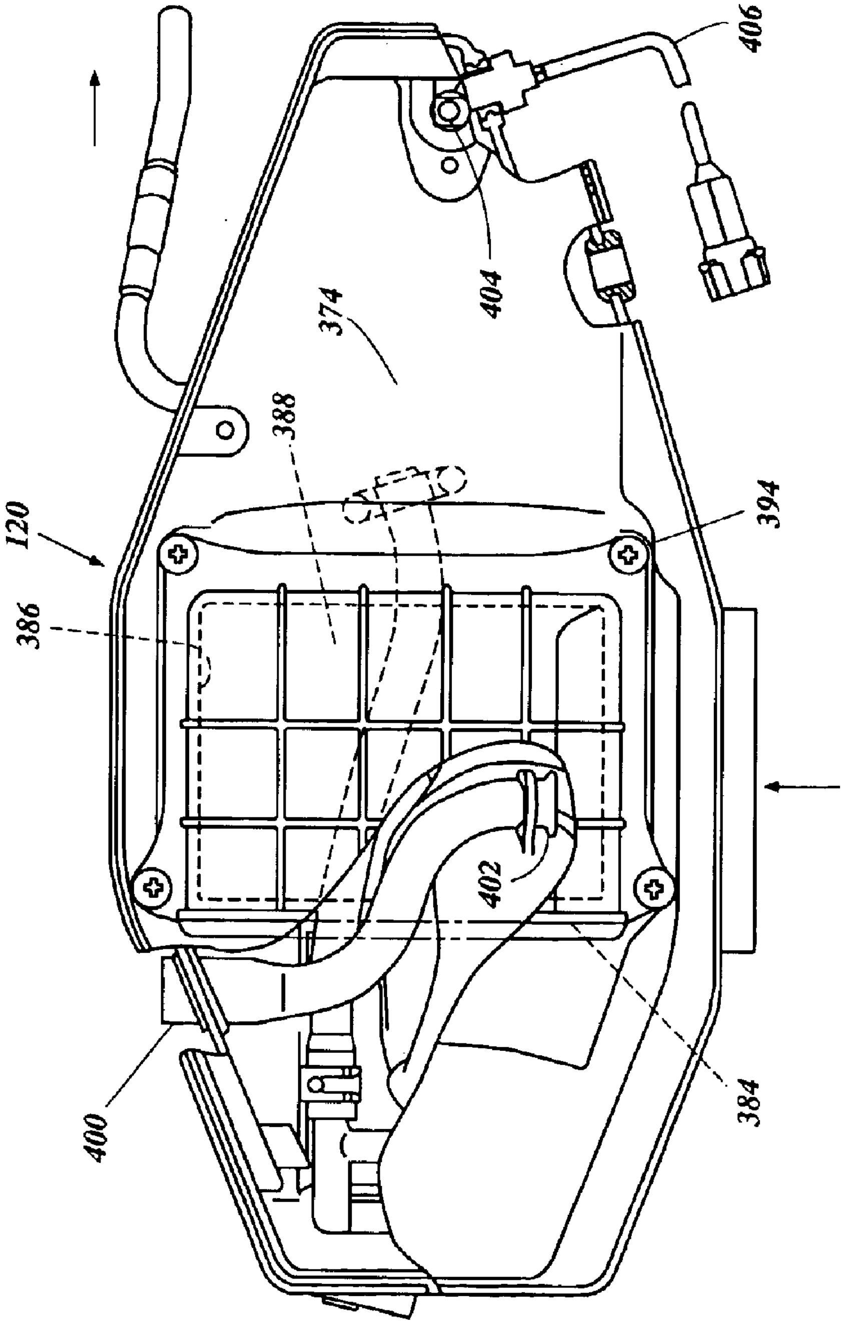
FIG. 18 is a top plan and partial cut-away view of the second air intake chamber illustrated in FIG. 16.

With reference to FIGS. 16 and 18, the second air intake chamber 120 is formed of a lower member 372 and an upper member 374. The upper and lower members 374, 372 are joined together around a periphery 376 thereof. An interior volume 378 is defined therebetween. As shown in FIG. 16, the inlet 370 is defined in the lower member 372.

The second intake air chamber 120 includes two inlets, i.e., the first inlet 370, and a second inlet 380. The inlet 380 is comprised of a lid member 382 which defines a rearwardly facing atmospheric opening 384. The lid member 382 is mounted over an aperture 386 defined in the upper member 374.

A second filter assembly 388 overlies the aperture 386. Preferably, the filter assembly 388 includes an upper flange 390 which extends around the periphery of the aperture 386. Preferably, the lid member 382 includes a peripheral flange 392 which extends over the flange 390. A plurality of screws 394 secure the lid 382 to the upper member 374 with the flange 390 sandwiched between the upper member 374 and the flange 392. The filter assembly 388 includes an outlet 394 on a lower surface thereof.

With continued reference to FIG. 16, the lower member 372 of the second intake air chamber 120 includes two outlets 396, 398 which receive the sleeves 134 of the throttle body assemblies 122, 124, respectively.

The induction system 82 is also configured to receive gases from the crankcase of the engine 14 and to guide those gases back to the combustion chamber of the engine 114 for combustion therein. A breather pipe 400 includes an inlet end on the exterior of the second intake air chamber 120 and an outlet end 402 terminating within the second intake air chamber 120 downstream from the outlet 394 of the second folder assembly 388. Preferably, another hose or a plurality of hoses and conduits (not shown) connects the inlet of the breather hose 400 with the crankcase 90 of the engine 14. As such, blow-by gases and other gases which aspirate out of lubricant within the engine 14 can be guided to the breather hose 400.

Preferably, an additional oil separator (not shown) is connected to the inlet of the breather hose 400 so as to prevent liquid oil from reaching the interior volume 378 of the second intake air chamber 120. Because the outlet 402 of the breather pipe 400 terminates in the interior volume 378 downstream from the outlet 394 of the filter assembly 388, such blow-by gases can be directly drawn through the throttle bodies 122, 124 into the combustion chambers for combustion therein.

With reference to FIGS. 16 and 18, the second intake air chamber 120 preferably includes an intake air temperature sensor 404. The intake air pressure temperature sensor 404 is configured to detect a temperature of air within the interior volume 378 and generate a signal indicative thereof. The air temperature sensor 404 is connected to the ECU through an air temperature signal line 406. Thus, the ECU can use the output of the intake air temperature sensor 404 in the feedback control system disclosed above.

With reference to FIG. 16, the second intake air chamber 120 also includes an idle speed controller air aperture 406. In the illustrated embodiment, the aperture 406 is defined in the lower member 372. The aperture 406 is connected to the inlet 152 (FIG. 6) of the idle speed control system 150. As such, the idle speed control system 150 can draw air A from the second intake air chamber 120 from a point downstream from the outlet 394 of the second filter assembly 388.

As shown in FIG. 4, the first intake air chamber is disposed on the right side of the engine, overlying the space formed between the cylinders 92, 94, in side elevational view. Additionally, the second intake air chamber 120 lies over the top of the engine body 80. Because each of the intake air chambers 116, 120 include their own filters, and since the first intake air chamber 116 communicates with the second intake air chamber 120 at a point downstream from the outlet 394 of the second air filter 388, the volumetric capacity of the induction system 82 is expanded. In particular, the interior volume 378 of the second intake air chamber 120 is fed with filtered air from both the filter 354 and the filter assembly 388. Thus, the induction system 82 effectively utilizes the limited space available above the top of the engine body 80 as well as the an area on the side of the engine body 80.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising a frame, an engine supported by the frame, a wheel supporting the frame, a transmission connecting the engine with the wheel, and an induction system configured to guide air to the engine, the induction system comprising a first intake air chamber having a first inlet, a first outlet, and a first filter, and a second intake air chamber having a second filter and a second outlet portion, the first outlet being connected to the second intake air chamber such that the first and second filters operate in parallel.

2. The motorcycle according to claim 1, wherein the first outlet is connected to the second intake air chamber at a position downstream, in a direction of air flow through the induction system, from the second filter.

3. A motorcycle comprising a frame, an engine supported by the frame, a wheel supporting the frame, a transmission connecting the engine with the wheel, and an induction system configured to guide air to the engine, the induction system comprising a first intake air chamber having a first inlet, a first outlet, and a first filter, and a second intake air chamber having a second filter and a second outlet portion, the first outlet being connected to the second intake air chamber, wherein the second intake air chamber includes a second inlet opening into the second intake air chamber upstream, in a direction of air flow through the induction system, from the second filter.

4. The motorcycle according to claim 3 additionally comprising a fuel tank, the second inlet opening being disposed below the fuel tank.

5. The motorcycle according to claim 1, wherein the second intake air chamber is disposed substantially above the engine body, the first intake air chamber being disposed below a top of the engine body.

6. The motorcycle according to claim 5, wherein the first intake air chamber is disposed on a side of the engine body.

7. The motorcycle according to claim 1 additionally comprising a first conduit connecting the first outlet with the second intake air chamber, the first intake air chamber defining a first cross-sectional flow area greater than that of the first conduit.

8. An induction system for an internal combustion engine comprising a first intake air chamber including a first inlet, a first air filter, and a first outlet, a second intake air chamber including a second inlet, a second air filter, and a second outlet connected to an induction passage of the internal combustion engine, the first intake air chamber being connected to the second intake air chamber, wherein the first intake air chamber is connected to the second intake air chamber at a position downstream from the second filter.

9. An induction system for an internal combustion engine comprising a first intake air chamber including a first inlet, a first air filter, and a first outlet, a second intake air chamber including a second inlet, a second air filter, and a second outlet connected to an induction passage of the internal combustion engine, the first intake air chamber being connected to the second intake air chamber, wherein the first intake air chamber is configured to be attached to a side of an internal combustion engine, the second intake air chamber being configured to be mounted above a top of the engine.

10. An induction system for an internal combustion engine comprising a first intake air chamber including a first inlet, a first air filter, and a first outlet, a second intake air chamber including a second inlet, a second air filter, and a second outlet connected to an induction passage of the internal combustion engine, the first intake air chamber being connected to the second intake air chamber, wherein the first inlet comprises a forwardly-facing opening.

11. An induction system for an internal combustion engine comprising a first intake air chamber including a first inlet, a first air filter, and a first outlet, a second intake air chamber including a second inlet, a second air filter, and a second outlet connected to an induction passage of the internal combustion engine, the first intake air chamber being connected to the second intake air chamber additionally comprising a first conduit connecting the first intake air chamber with the second intake air chamber, the first intake air chamber defining a cross sectional air flow area greater than that of the conduit.

12. The induction system according to claim 8, wherein the second outlet comprises first and second outlet passages configured to couple with throttle bodies of the internal combustion engine.

13. The induction system according to claim 12, wherein the first and second outlet passages are skewed relative to each other.

14. The induction system according to claim 8, wherein the second inlet is disposed in a top surface of the second intake air chamber.

15. A motorcycle comprising a frame, an engine supported by the frame, a wheel supporting the frame, a transmission connecting the engine with the wheel, and an induction system configured to guide air to the engine, the induction system comprising a first intake air chamber connected to a second intake air chamber, the first intake air chamber being disposed on a side of the engine and the second intake air chamber being disposed above a top of the engine.

16. The motorcycle according to claim 15 additionally comprising a first air filter disposed in the first intake air chamber, and a second filter disposed in the second intake air chamber.

17. The motorcycle according to claim 16, wherein the first intake air chamber communicates with the second intake air chamber at a point downstream, in a direction of air flow through the induction system during operation, of the second filter.

18. The motorcycle according to claim 16 additionally comprising a fuel tank disposed above the second intake air chamber.

19. The motorcycle according to claim 16, wherein the engine comprises two cylinder blocks disposed at a V-angle relative to each other and a plurality of throttle bodies disposed between the cylinder blocks.

20. A motorcycle comprising a frame, an engine supported by the frame, a wheel supporting the frame, a transmission connecting the engine with the wheel, and an induction system configured to guide air to the engine, the induction system comprising a first intake air chamber disposed on a side of the engine and having a first inlet, a first outlet, and a first filter, and a second air chamber disposed above the engine and extending generally horizontally, the second air chamber having a second inlet connected to the first outlet of the first air chamber and a third inlet not connected to the first air chamber, the second air chamber further including a lower portion, first and second induction conduits extending from the lower portion of the second air chamber to the engine.

21. The motorcycle according to claim 20, wherein the lower portion of the second air chamber comprises a lower wall.

22. The motorcycle according to claim 20, wherein the lower wall extends generally horizontally.

23. A motorcycle comprising a frame, an engine supported by the frame, a wheel supporting the frame, a transmission connecting the engine with the wheel, and an induction system configured to guide air to the engine, the induction system comprising a first intake air chamber disposed on a side of the engine and having a first inlet, a first outlet, and a first filter, and a second air chamber disposed above the engine and extending generally horizontally, the second air chamber having a second inlet connected to the first outlet of the first air chamber, the second air chamber further including a lower portion, first and second induction conduits extending from the lower portion of the second air chamber to the engine, wherein the first and second conduits cross each other in side elevational view.

24. A motorcycle comprising a frame, an engine supported by the frame, a wheel supporting the frame, a transmission connecting the engine with the wheel, and an induction system configured to guide air to the engine, the induction system comprising a first intake air chamber disposed on a side of the engine and having a first inlet, a first outlet, and a first filter, and a second air chamber disposed above the engine and extending generally horizontally, the second air chamber having a second inlet connected to the first outlet of the first air chamber and a second filter, the second air chamber further including a lower portion, first and second induction conduits extending from the lower portion of the second air chamber to the engine, wherein the second air chamber includes a third inlet configured to allow air to be drawn into the second chamber, through the second filter, and into the first and second induction conduits.

25. A motorcycle according to claim 20, wherein the third inlet communicates with the environment.

* * * * *